(12) United States Patent
Biss et al.

(10) Patent No.: US 9,382,066 B2
(45) Date of Patent: Jul. 5, 2016

(54) SLIDING WALL HOPPER METHODS, SYSTEMS, AND DEVICES

(71) Applicant: Proton Power, Inc., Lenoir City, TN (US)

(72) Inventors: Bryan Biss, Knoxville, TN (US); Tom Bradshaw, Knoxville, TN (US); Nick Shaffer, Knoxville, TN (US)

(73) Assignee: PROTON POWER, INC., Lenoir City, TN (US)

( * ) Notice: Subject to any disclaimer, the term of this patent is extended or adjusted under 35 U.S.C. 154(b) by 0 days.

(21) Appl. No.: 14/179,598

(22) Filed: Feb. 13, 2014

(65) Prior Publication Data

US 2014/0246362 A1    Sep. 4, 2014

Related U.S. Application Data

(60) Provisional application No. 61/765,241, filed on Feb. 15, 2013, provisional application No. 61/782,800, filed on Mar. 14, 2013.

(51) Int. Cl.

| | |
|---|---|
| *B65D 88/64* | (2006.01) |
| *B65D 88/60* | (2006.01) |
| *B65D 88/32* | (2006.01) |
| *B65D 88/66* | (2006.01) |
| *B65D 88/58* | (2006.01) |
| *B65G 65/46* | (2006.01) |

(52) U.S. Cl.
CPC ............... *B65D 88/64* (2013.01); *B65D 88/32* (2013.01); *B65D 88/58* (2013.01); *B65D 88/60* (2013.01); *B65D 88/66* (2013.01); *B65G 65/46* (2013.01)

(58) Field of Classification Search
CPC ........ B65D 88/60; B65D 88/66; B65D 88/68; B65D 88/64
USPC ................... 209/245, 244; 222/199, 233, 234
See application file for complete search history.

(56) References Cited

U.S. PATENT DOCUMENTS

| | | | | |
|---|---|---|---|---|
| 2,025,641 | A * | 12/1935 | Brown | ........................... 222/620 |
| 2,905,365 | A * | 9/1959 | Thayer | ................... B65D 88/66 222/198 |
| 4,498,635 | A * | 2/1985 | Fielding | .......................... 241/94 |

(Continued)

FOREIGN PATENT DOCUMENTS

| | | | | |
|---|---|---|---|---|
| GB | | 926666 A * | 5/1963 | ............. B65D 88/66 |
| JP | | 2000103524 A * | 4/2000 | |

(Continued)

OTHER PUBLICATIONS

International Search Report and Written Opinion for PCT/2014/016351 dated Jun. 16, 2014, ISA/KR.

(Continued)

*Primary Examiner* — Luis A Gonzalez
(74) *Attorney, Agent, or Firm* — Wilson Patent Law, LLC

(57) ABSTRACT

Methods, systems, and device are provided for utilizing a sliding wall hopper. A sliding wall hopper may include one or more sliding walls that may slide with respect to one or more outer supports of the hopper. The one or more sliding walls may make contact with at least a portion of the material moving through the hopper. The material may be discharged to at least a hopper discharge or a conveyor device. Some embodiments may be configured for use with biomass as the material, but other materials may also be utilized.

26 Claims, 20 Drawing Sheets

(56) References Cited

U.S. PATENT DOCUMENTS

| | | | |
|---|---|---|---|
| 4,629,410 A | 12/1986 | Hehl | |
| 4,691,846 A * | 9/1987 | Cordell et al. | 222/198 |
| 4,711,607 A | 12/1987 | Wynosky | |
| 5,160,016 A | 11/1992 | Moksnes | |
| 5,188,262 A * | 2/1993 | Fielding | 222/201 |
| 5,215,228 A * | 6/1993 | Andrews et al. | 222/203 |
| 6,708,851 B2 * | 3/2004 | DaSilva | 222/200 |
| 6,830,597 B1 | 12/2004 | Green | |
| 2007/0295581 A1 | 12/2007 | Ash | |

FOREIGN PATENT DOCUMENTS

| | | |
|---|---|---|
| JP | 2001011845 | 1/2001 |
| JP | 2006089175 A * | 4/2006 |

OTHER PUBLICATIONS

Non-Final Office Action for U.S. Appl. No. 14/179,595, dated Dec. 9, 2014, USPTO.

Final Office Action for U.S. Appl. No. 14/179,595, dated Jul. 30, 2015, USPTO.

* cited by examiner

SLIDING WALL HOPPER METHODS, SYSTEMS, AND DEVICES

CROSS-REFERENCES TO RELATED APPLICATIONS

This application is a non-provisional patent application claiming priority benefit of U.S. provisional patent application Ser. No. 61/765,241, filed on Feb. 15, 2013 and entitled "SLIDING WALL HOPPER METHODS, SYSTEMS, AND DEVICES," the entire disclosure of which is herein incorporated by reference for all purposes, and U.S. provisional patent application Ser. No. 61/782,800, filed on Mar. 14, 2013 and entitled "SLIDING WALL HOPPER METHODS, SYSTEMS, AND DEVICES," the entire disclosure of which is herein incorporated by reference for all purposes.

BACKGROUND

Biomass may be becoming a suitable global resource for economies around the world and groups are increasingly looking for ways to utilize biomass to meet local needs (i.e., energy generation, heat generation, liquid fuels, compost, etc.). In order to use biomass to meet the needs of local communities, transporting, storing, conveying, and/or processing biomass is generally involved. Automation within the biomass industry may become commonplace and automation may be beneficial for biomass projects to be profitable. In many applications, a regulated flow of biomass within the process stream may be beneficial. Problems may arise within each process when continuous flow may be halted. There may be a need in the biomass industry for storage systems that discharge material with efficiency, reliability and versatility.

Biomass is typically a light fibrous material that may absorb moistures and may be reluctant to flow into automation equipment. The resistance to flow may be qualified for any material using metrics available within the solids flow industry. Some of the indexes for measuring flow ability include: Arching Index; Chute Index; Hopper Index; Rathole Index; Bin Density Index; Feeder Density Index; Flow Rate Index; and/or Spring Back Index.

While it may be helpful to know and understand these indexes, it may be very likely that the each batch of biomass may have varying flow characteristics. This means that these indexes may change continuously as the biomass properties (moisture, particle size, dirt content, density, etc.) change.

Typically, hoppers may be designed to accommodate one unique material. In some cases, the flow of material may halt when the material properties change. Typical agitation methods may oppose the adhesive and cohesive forces that may arise. This may consume more energy and can involve in some cases sweeping motion at multiple points in the process. Sweeping agitation may also generate more flow problems by compressing pockets of material in areas out of reach of the sweeping motion.

SUMMARY

Methods, systems, and devices are provided for utilizing a sliding wall hopper. Some embodiments may handle changes in material properties because they may be designed to be conducive to flow while using the exact material properties that resist flow to produce or generate flow. The varying adhesion and cohesion forces found in biomass or other materials may be used to break and flake the biomass or other material into a conveying or automation system.

Some embodiments may be configured so that the biomass or other material may not be sheared, but may tumble, keeping the internal biomass or other material pile "live" and in motion. For example, a mechanism for keeping material "live" may be by constantly changing the state of contents by putting the contents in tension and compression alternatively. These tools and techniques may maintain a uniform pile pressure through constant force distribution throughout the biomass pile. This may be done by oscillation of sliding walls. Some embodiments may create continuous flow with different types of biomass or other materials. Some embodiments may involve less torque compared with other agitation methods.

The tools and techniques provided may be capable of generating continuous flow with different materials, including difficult flowing materials. The tools and techniques provided may eliminate the common solids handling failure modes of plugging, bridging, arching, rat holing and more. The tools and techniques may be scalable and may be used for different aspects of large material, such as biomass, handling projects.

Some embodiments include a method of moving material through a hopper. The method may include: introducing the material into the hopper; sliding one of more one walls of the hopper with respect to one or more outer supports of the hopper, wherein the one or more sliding walls make contact with at least a portion of the material; and/or discharging the material to at least a hopper discharge or a conveyor device. In some embodiments, the sliding walls may be referred to as false walls.

In some embodiments, sliding the one or more walls includes sliding at least a first wall and a second wall, wherein sliding the first wall is out of phase from sliding the second wall. Some embodiments may slide the one or more walls in phase with respect to each other or some other phase. Sliding the one or more walls may include sliding the one or more walls in at least a vertical direction with respect to the hopper discharge. In some cases, one or more of the walls may be moved in a direction such that the contents of the hopper may contact the wall due to gravity. In some cases, the one or more walls may move in a direction normal to the content of the hopper. Sliding the one or more walls may include sliding the one or more walls at least towards or away from the hopper discharge.

Some embodiments of the method include coupling at least mechanically or electronically at least one of the one or more walls with the conveyor device. In some embodiments, the conveyor device includes an auger device. Some embodiments include moving at least one of the one or more outer supports of the hopper. Some embodiments may involve additional moving parts such as moving outer walls or supports. Moving at least one of the one or more outer walls of the hopper may be towards the material.

In some embodiments, each of the one or more sliding walls each slide in a respective plane. In some embodiments, the one or more walls are positioned at an angle between 30 degrees and 80 degree with respect to a horizontal plane that is perpendicular to a gravitational force or the hopper discharge. The one or more walls may be positioned at an angle between 45 degrees and 75 degrees with respect to a horizontal plane that is perpendicular to a gravitational force or the hopper discharge. The one or more walls may be positioned at an angle between 55 degrees and 65 degrees with respect to a horizontal plane that is perpendicular to a gravitational force or the hopper discharge. Some embodiments may utilize one or more walls that are positioned at other angles.

In some embodiments, the one or more outer supports include one or more outer walls. The one or more outer supports may include one or more roller supports.

Some embodiments of the method include sealing the hopper. In some embodiments, the method includes pressurizing the hopper.

In some embodiments, the material includes a biomass.

In some embodiments, the hopper discharge includes another hopper. Some embodiments then include: introducing at least a portion of the material into the other hopper; sliding one of more one walls of the other hopper with respect to one or more outer supports of the other hopper, wherein the one or more sliding walls make contact with at least a portion of the material; and/or discharging the material to at least another hopper discharge or another conveyor device. Thus, some embodiments include another hopper vertically integrated with the hopper. Some embodiments may include another hopper horizontally integrated with the hopper.

In some embodiments, the one or more walls include a mesh wall. The mesh wall may be configured to go from one side of the hopper to another side of the hopper. The mesh wall may be configured to slide underneath the conveyor device. In some case, the hopper may be utilized as a particle size classifier. The hopper may be utilized as a particle size classifier with respect to two or more particle sizes. The mesh wall may include varying opening sizes.

In some embodiments, one or more walls include different coatings, textures, spikes, indentions, convex, concave, heating coils, cooling coils, expandable bladder material and/or or something other than flat metal walls.

Some embodiments include sliding one or more additional walls positioned with respect to a chute coupled with one or more outer supports, the hopper discharge, or the conveyor device. Some embodiments include sliding one or more additional walls positioned with respect to the conveyor device.

Some embodiments include a sliding wall hopper system. The system may include: one or more outer hopper supports; one or more inner hopper walls; and/or one or more agitation devices coupled with the one or more inner hopper walls, wherein the one or more agitation devices slide the one or more inner hopper walls with respect to the one or more outer hopper supports.

The one or more agitation devices may slide the one or more inner hopper walls with respect to the outer hopper supports such that a first inner wall slides out of phase with a second inner wall. Some embodiments may slide the one or more inner walls in phase with respect to each other or some other phase. The one or more agitation devices may slide the one or more inner hopper walls with respect to the outer hopper supports such that the one or more inner walls moves in at least a vertical direction.

Some embodiments include a conveyor device at least mechanically or electronically coupled with the one or more agitation devices. In some embodiments, the conveyor device includes an auger device. In some embodiments, the conveyor device includes at least a chain drag conveyor, a belt conveyor, a vibratory conveyor, a pneumatic conveyor, or another conveyor device.

In some embodiments, the one or more agitation devices are coupled with the one or more outer supports of the hopper system. The one or more agitation devices may be coupled with the one or more outer walls of the hopper such that at least one of the one or more outer supports of the hopper moves towards a center of the hopper.

In some embodiments, one or more agitation devices slide the one or more inner hopper walls with respect to the outer hopper supports such that each of the one or more sliding inner walls each slides in a respective plane.

In some embodiments, one or more inner walls are positioned at an angle between 30 degrees and 80 degree with respect to a horizontal plane that is perpendicular to a gravitational force or a hopper discharge. The one or more inner walls may be positioned at an angle between 45 degrees and 75 degrees with respect to a horizontal plane that is perpendicular to a gravitational force or the hopper discharge. The one or more inner walls may be positioned at an angle between 55 degrees and 65 degrees with respect to a horizontal plane that is perpendicular to a gravitational force or the hopper discharge. Other angles may be utilized in some cases.

The one or more agitation devices may slide the one or more inner hopper walls towards a hopper discharge. The one or more outer hopper supports may include one or more outer walls in some embodiments. The one or more outer supports may include one or more roller supports. The agitation device may couple with an inner or an outer surface of the inner hopper walls in some cases.

Some embodiments include a hopper lid configured to facilitate sealing the hopper system. Some embodiments include a pressure source configured to pressurize the hopper system.

In some embodiments, the system may include a first hopper device that includes: the one or more outer hopper supports; the one or more inner hopper walls; and/or the one or more agitation devices coupled with the one or more inner hopper walls, wherein the one or more agitation devices slide the one or more inner hopper walls with respect to the one or more outer hopper supports. The system may also include a second hopper device including: one or more outer hopper supports; one or more inner hopper walls; and/or one or more agitation devices coupled with the one or more inner hopper walls, wherein the one or more agitation devices slide the one or more inner hopper walls with respect to the one or more outer hopper supports.

In some embodiments, the first hopper device is vertically integrated with the second hopper device. In some embodiments, the first hopper device is horizontally integrated with the second hopper device.

In some embodiments, one or more walls include a mesh wall. The mesh wall may be configured to go from one side of the hopper system to another side of the hopper system. The mesh wall may be configured to slide underneath a conveyor device. In some embodiments, the system is configured as a particle size classifier. In some embodiments, the mesh wall includes varying opening sizes. In some embodiments, the system is configured as a particle size classifier with respect to two or more particle sizes In some embodiments, the one or more walls include different coatings, textures, spikes, indentions, convex, concave, heating coils, cooling coils, expandable bladder material and/or or something other than flat metal walls.

In some embodiments, one or more sliding walls may be positioned with respect to a chute coupled with one or more outer hopper supports. Some embodiments include one or more sliding walls positioned with respect to the conveyor device. Some embodiments include one or more sliding walls positioned with respect to a chute coupled a system discharge.

Some embodiments include methods, systems, and/or devices as described and/or shown in the figures, and/or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
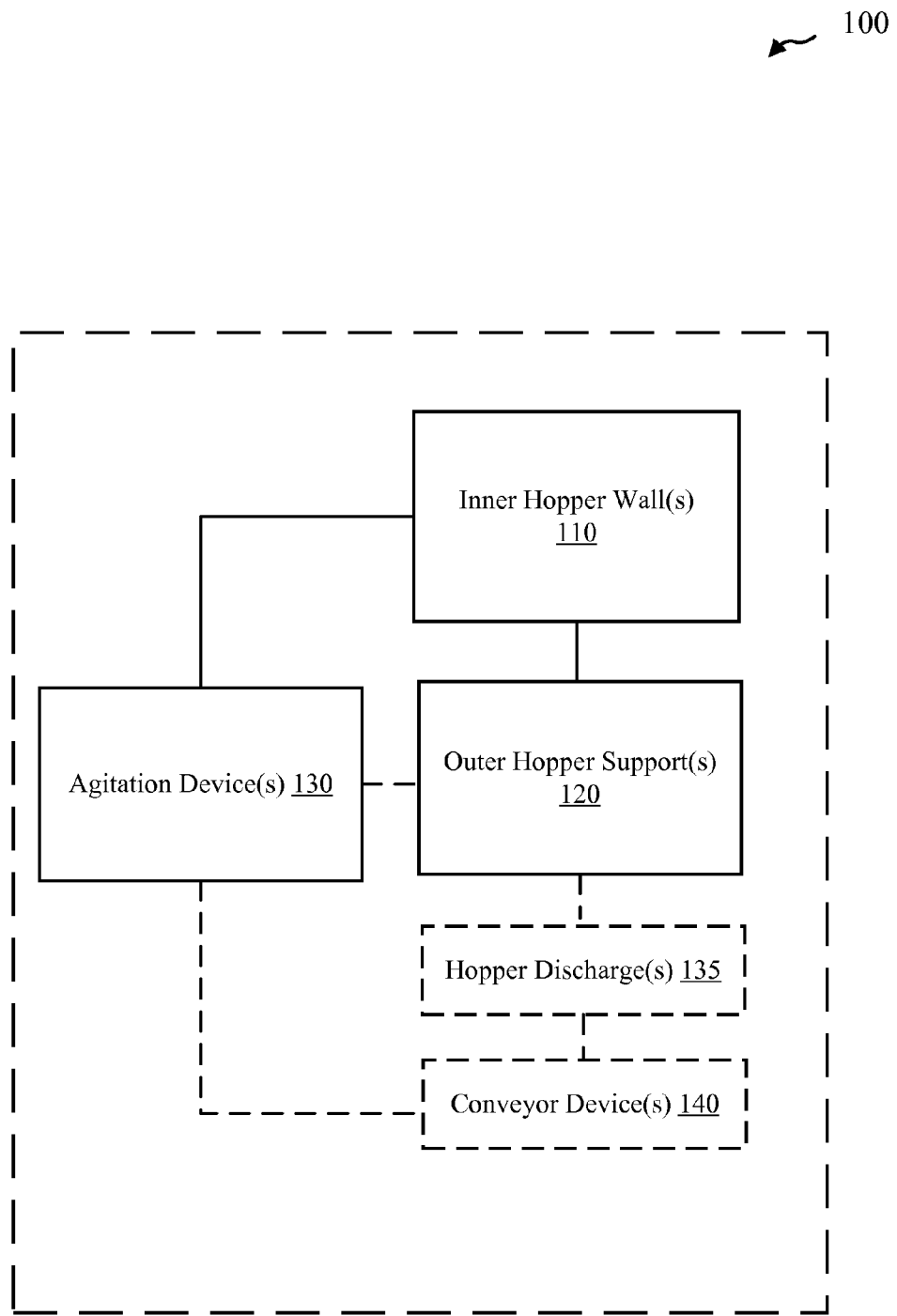
FIG. 1 shows a block diagram of a hopper system in accordance with various embodiments.

This description provides examples, and is not intended to limit the scope, applicability or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Methods, systems, and device are provided for utilizing a sliding wall hopper. Some embodiments may handle changes in material properties because they may be designed to be conducive to flow while using the exact material properties that resist flow to produce or generate flow. The varying adhesion and cohesion forces found in biomass or other materials may be used to break and flake the biomass or other material into a conveying or automation system.

Some embodiments may be configured so that the biomass or other material may not be sheared, but may tumble, keeping the internal biomass or other material pile "live" and in motion. These tools and techniques may maintain a uniform pile pressure through constant force distribution throughout the biomass pile. This may be done by oscillation of sliding walls. Some embodiments may create continuous flow with different types of biomass or other materials. Some embodiments may involve less torque compared with other agitation methods.

The tools and techniques provided may be capable of generating continuous flow with different materials, including difficult flowing materials. The tools and techniques provided may eliminate the common solids handling failure modes of plugging, bridging, arching, rat holing and more. The tools and techniques may be scalable and may be used for different aspects of large material, such as biomass, handling projects.

Embodiments may utilize different discharge systems coupled with a sliding wall hopper. For example, some embodiments may utilize a helical screw conveyor that may include auger discharge system to regulate flow of material, including biomass. Other conveyor devices may be utilized in some cases (belt, chain drag, air lock, etc.). Some embodiments include a vertical chute coming straight up at a height that is equal to the width. This chute may allow proper clearance for sliding wall oscillation in accordance with various embodiments. The chute geometry may also minimize bridging, plugging, or non-flow scenarios above a conveyor device, for example. Some embodiments include four-sided container with two vertical walls perpendicular to the discharge direction and two walls that flare out above the chute at a 70-degree angle of repose. Other angles may be utilized. Some embodiments involve inserted two walls into the hopper running parallel on the same surface as 70-degree walls.

Lifting the walls may agitate the entire biomass or other material contents within the hopper.

In some cases, lifting one wall up while the other wall was going down may be beneficial. While most agitation methods try to agitate the entire hopper contents, some embodiments involve perimeter agitation and may rely on the biomass (or other material) adhesive and cohesive properties to agitate the entire interior contents. Gravity may be used to oppose these biomass (or other material) forces, which may result in a much more efficient way to maintain continuous biomass (or other material) flow.

Oscillation of these walls may create alternating tension and compression forces on the same biomass (or other material) pile. By keeping the contents and walls live or kinetic, static friction forces within the pile and between the pile and the wall may be reduced. This wall movement may cause the entire contents to tumble back and forth, while may allow the entire internal contents stay in motion. In some embodiments, one or more bearing surfaces of the sliding walls may be attached to the moving wall so that rigid or non-moving internal surfaces that cause bridging may be reduced and/or minimized. In some cases, the hopper may be filled to the brim and empty its contents entirely without tampering.

Some embodiments create gyrating motion through a flywheel and moment arm mechanism. For other applications, other actuation methods to generate the gyrating wall motion. This may include but is not limited to cylinders, rotary actuators, linear rails, gears, clutches, etc. In some cases, the sliding wall actuation method may be a matter of preference and installation site infrastructure.

Turning now to FIG. 1, a block diagram of a hopper system 100 in accordance with various embodiments is provided. Hopper system 100 may be referred to in some cases as a sliding wall hopper system or device. System 100 may include one or more outer hopper supports 120. System 100 may include one or more inner hopper walls 110. In some cases, inner hopper walls 110 may be referred to as inner false hopper walls. System 100 may include one or more agitation devices 130 coupled with the one or more inner hopper walls 110. The one or more agitation devices 130 may be configured to slide the one or more inner hopper walls 110 with respect to the one or more outer hopper supports 120. In some embodiments, the inner hopper walls may be referred to as inner false hopper walls.

In some embodiments, one or more agitation devices 120 slide the one or more inner hopper walls 110 with respect to the outer hopper supports 120 such that a first inner wall slides out of phase with a second inner wall. Some embodiments may slide the one or more inner walls 110 in phase with respect to each other or some other phase. In some embodiments, the one or more agitation devices 130 slide the one or more inner hopper walls 110 with respect to the outer hopper supports 120 such that the one or more inner walls moves in at least a vertical direction with respect to a hopper discharge 135.

In some embodiments, system 100 may include a conveyor device 140. In some cases, the conveyor device 140 may be at least mechanically or electronically coupled with the one or more agitation devices 130. The conveyor device 140 may include an auger device in some cases. The conveyor device 140 may include at least a chain drag conveyor, a belt conveyor, a vibratory conveyor, a pneumatic conveyor, or another conveyor device.

In some embodiments, the one or more agitation devices 130 may be coupled with the one or more outer supports 120 of the hopper system 100. In some embodiments, the one or more agitation devices 130 are coupled with the one or more outer supports 120 of the hopper system 100 such that at least one of the one or more outer supports 120 of the hopper system 100 moves towards a center of the hopper system 100. In some embodiments, the one or more agitation devices 130 slide the one or more inner hopper walls 110 with respect to the outer hopper supports 120 such that each of the one or more sliding inner walls 110 each slides in a respective plane.

In some embodiments, the one or more inner walls 110 are positioned at an angle between 30 degrees and 80 degree with respect to a horizontal plane that is perpendicular to a gravitational force or the hopper discharge 135. The one or more inner walls may be positioned at an angle between 45 degrees and 75 degrees with respect to a horizontal plane that is perpendicular to a gravitational force or the hopper discharge 135. The one or more inner walls may be positioned at an angle between 55 degrees and 65 degrees with respect to a horizontal plane that is perpendicular to a gravitational force or the hopper discharge 135. Other angles may be utilized in some embodiments In some embodiments, the one or more agitation devices 130 slide the one or more inner hopper walls 110 towards the hopper discharge 135. A hopper discharge 135 may couple the outer hopper supports 120 with the conveyor device 140 in some cases. The one or more outer hopper supports 120 may include one or more walls, which may be solid. In some cases, the one or more walls may not be solid, such as the case of a mesh wall. In some embodiments, the one or more outer supports 120 may include one or more roller supports.

Some embodiments may include inner hopper walls that may slide or move in numerous directions. For example, with respect to a hopper discharge direction, such as a conveyor discharge direction, the inner hopper walls may move or slide parallel, perpendicular, and/or rotational movement.

Some embodiments may provide one or more sliding components with respect to a chute and/or a conveyor device. For example, some embodiments may include a hopper discharge that may include a chute. One or more walls of the chute may be configured to move and/or slide vertically, horizontally, and/or laterally. Similarly, for the hopper discharge that may include a conveyor device, such as an auger device, sliding and/or moving action may be created next to the conveyor device.

In some embodiments, the inner hopper walls may include a variety of materials. For example, the walls may include different coatings, textures, spikes, indentions, convex, concave, heating coils, cooling coils, expandable bladder material and/or something other than just flat metal walls.

Some embodiments of system 100 may include a hopper lid (not shown) configured to facilitate sealing the hopper system 100. Some embodiments of system 100 may include a pressure source configured to pressurize the hopper system 100.

Figure 2A:
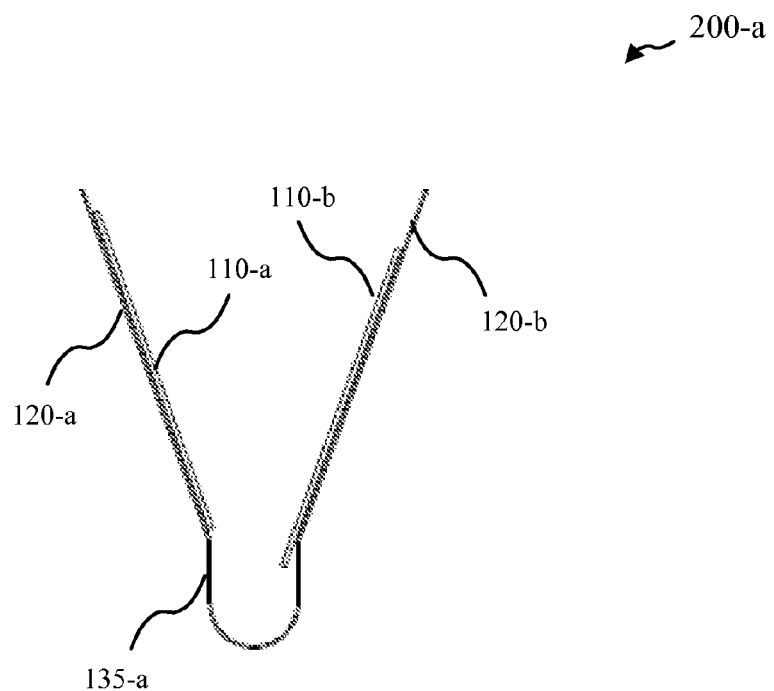
FIGS. 2A, 2B, 2C, and 2D show aspects of sliding wall hopper systems in accordance with various embodiments.
Figure 2B:
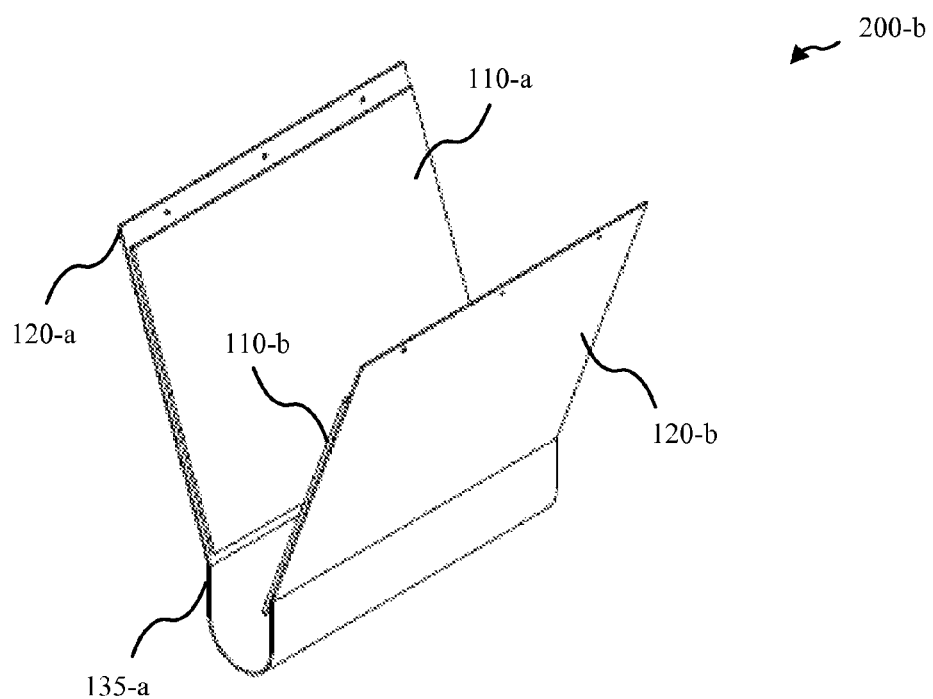

Turning now to FIG. 2A and FIG. 2B, aspects of a sliding wall hopper system 200-a and 200-b are shown in accordance with various embodiments. Systems 200-a and/or 200-b may provide examples of aspects of system 100 of FIG. 1 or other sliding wall hopper systems described herein. System 200-a shows a front view, while system 200-b shows an isometric view. System 200-a and system 200-b may include inner walls 110-a and 110-b, and outer hopper supports 120-a and 120-b. Systems 200-a and 200-b may also include a hopper discharge 135-a. This may be coupled with a conveyor device. Hopper discharge 135-a may also include a chute portion. FIGS. 2A and 2B show a start and/or end of cycle position of the inner walls 110-a and 110-b in accordance with various embodiments.

Figure 2C:
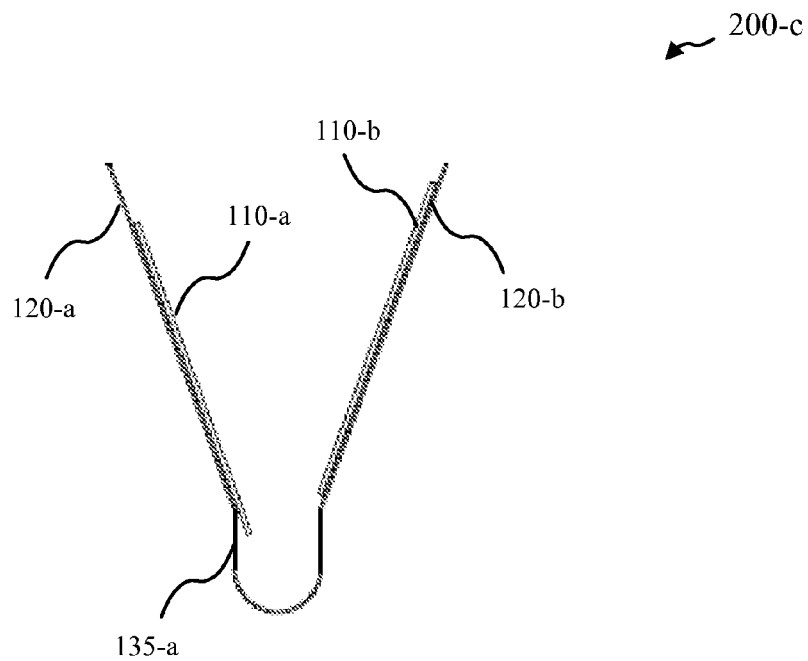
Figure 2D:
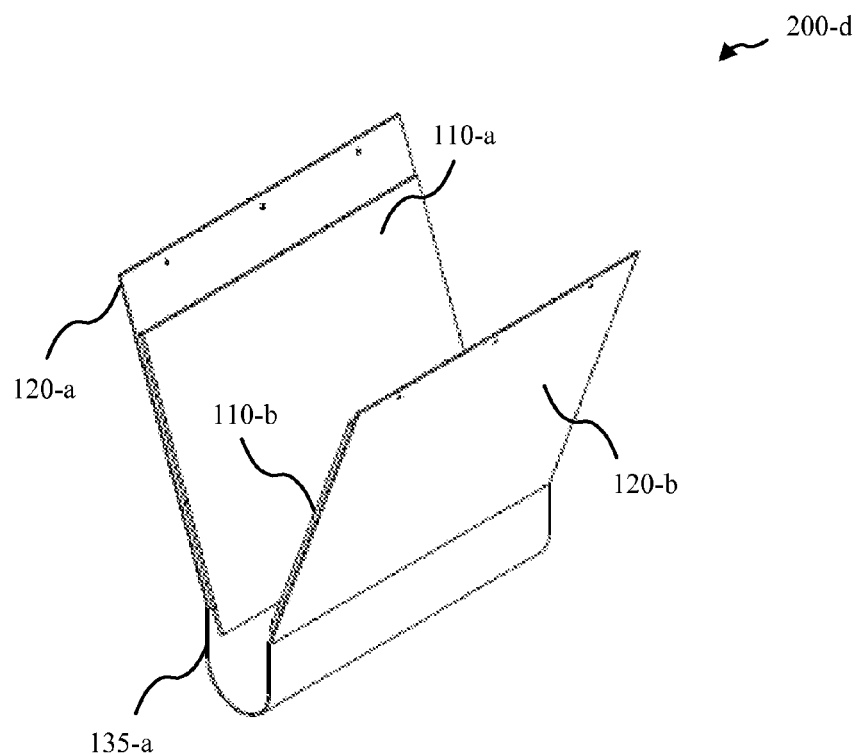

Similarly, FIG. 2C and FIG. 2D show aspects of a sliding wall hopper system 200-c and 200-c are shown in accordance with various embodiments. Systems 200-c and/or 200-d may provide examples of aspects of system 100 of FIG. 1 or other sliding wall hopper systems described herein, such as systems 200-a and/or 200-b. System 200-c shows a front view, while system 200-d shows an isometric view. System 200-c and system 200-d may include inner walls 110-a and 110-b, and outer hopper supports 120-a and 120-b. Systems 200-c and 200-d may also include a hopper discharge 135-a. This may be coupled with a conveyor device in some embodiments. Hopper discharge 135-a may also include a chute portion and/or a trough portion. FIGS. 2C and 2C show a mid-cycle position of the inner walls 110-a and 110-b in accordance with various embodiments.

Figure 3A:
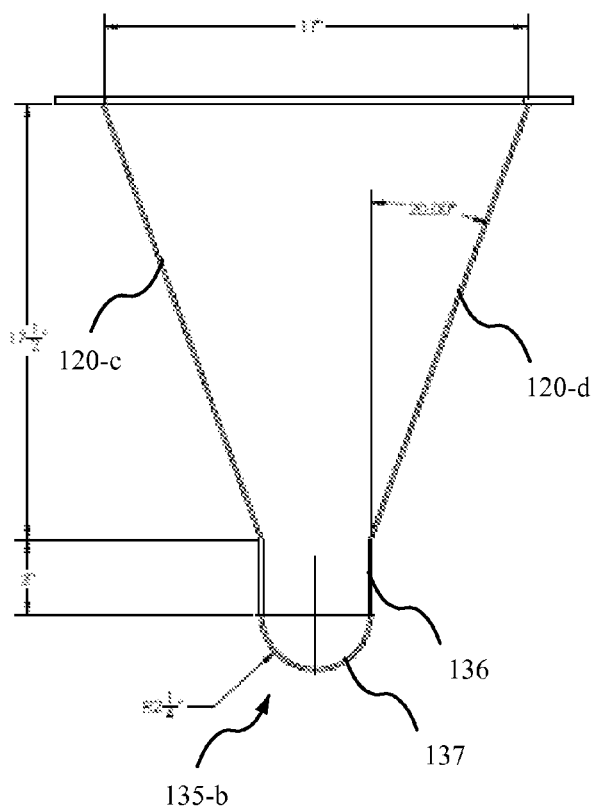
FIG. 3A shows a sliding wall hopper vessel shape in accordance with various embodiments.

Turning now to FIG. 3A, a profile of a sliding wall hopper vessel shape 300-a in accordance with various embodiments is provided. Vessel shape 300-a may provide examples of aspects of system 100 of FIG. 1 or other sliding wall hopper systems described herein. This embodiment shows a 70 degree angled wall 120-c and 120-d so the forces of gravity cause particles to fall. The angle may be defined with respect to a gravitational force in some cases. Other embodiments may utilize different angled walls. The two 70-degree walls 120-c and 120-d along with a hopper discharge 135-b, that may include a chute 136 and/or a trough 137, can be made with one piece of metal by using a standard metal break, for example. The chute section 136 beneath the angled walls 120-c and 120-d may reduce build up above the discharge area or trough. This geometry combination may generate continuous flow with granular material but may not create flow with fibrous material, such as biomass. The dimensions and angles show in profile 300 are shown to provide examples, while other embodiments may utilize different dimensions and/or angles.

Figure 3B:
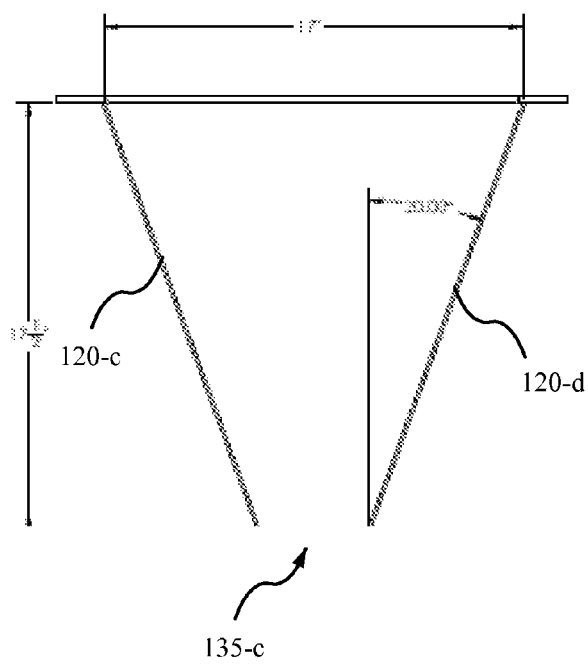
FIG. 3B shows a sliding wall hopper vessel shape in accordance with various embodiments.

Turning now to FIG. 3B, a profile of a sliding wall hopper vessel shape 300-b in accordance with various embodiments is provided. Vessel shape 300-b may provide examples of aspects of system 100 of FIG. 1 or other sliding wall hopper systems described herein. For example, vessel shape 300-b may be a variation of vessel shape 300-a of FIG. 3A. This embodiment shows a 70 degree angled wall 120-c and 120-d so the forces of gravity cause particles to fall. The angle may be defined with respect to a gravitational force in some cases. Other embodiments may utilize different angled walls. Vessel shape 300-b may include a hopper discharge 135-c that may represent an opening with respect to the angled walls 120-c and 120-d. This geometry combination may generate continuous flow with granular material but may not create flow with fibrous material, such as biomass. The dimensions and angles show in profile 300-b are shown to provide examples, while other embodiments may utilize different dimensions and/or angles.

Figure 4:
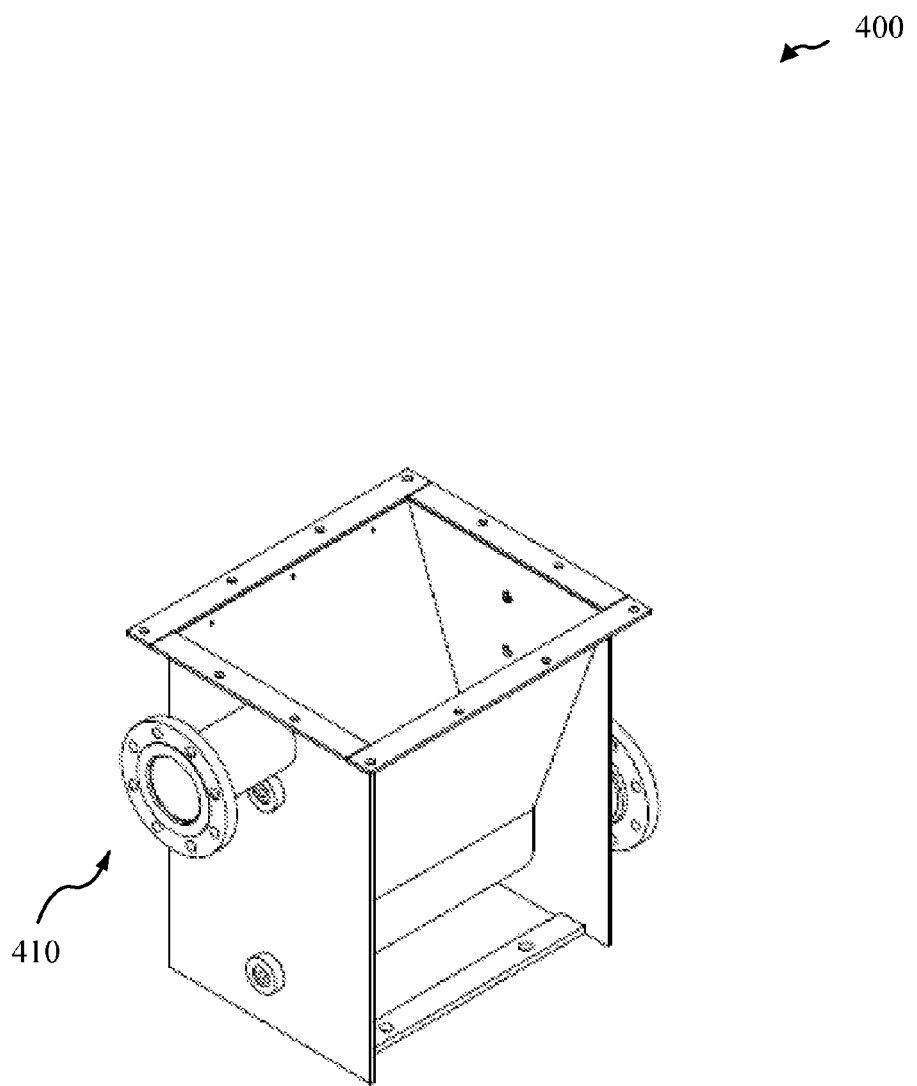
FIG. 4 shows an isometric view of a sliding wall hopper system in accordance with various embodiments.

FIG. 4 shows an isometric view of a sliding wall hopper system 400 without any agitation mechanisms in accordance with various embodiments. The container may be filled from the top or from the side-wall 410. System 400 may provide an example of aspects of system 100 of FIG. 1 or other sliding wall hopper systems described herein.

Figure 5A:
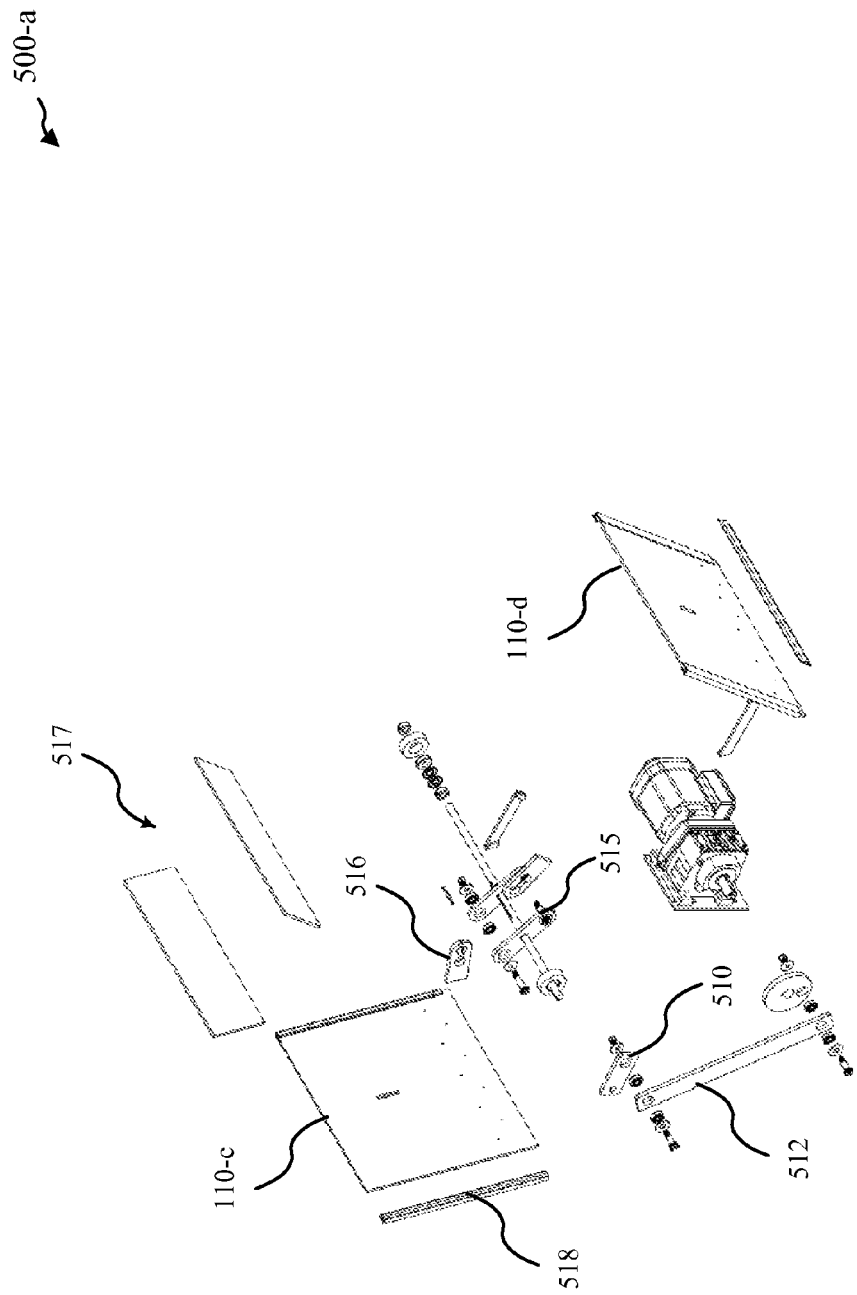
FIG. 5A shows an exploded view of a sliding wall hopper system in accordance with various embodiments.

FIG. 5A shows an explosion view of a sliding wall hopper system 500-a in accordance with various embodiments. System 500-a may provide an example of aspects of system 100 of FIG. 1 or other sliding wall hopper systems described herein. System 500-a may include multiple sliding walls, such as sliding wall 110-c and 110-d. System 500-a may include short linkage arm 510, which may creating the rocking or sliding motion. System 500-a may include a long linkage arm 512, which may create the rocking or sliding motion. System 500-a may include one or more feed hopper moment arms 515. Arm(s) 515 may hold two more fixed pins that may slide and down the slot of feeder hopper agitator tab(s) 516, which may attach to sliding walls 110-c and/or 110-d. Agitator tab 516 may be configured to include a knife cleaning edge, which may help ensure that the opening of the tab does not get packed with material. System 500-a may include one or more guide plates 517, that may keep falling material, such as biomass, from going behind the sliding walls 110-c and/or 110-d. System 500-a may include one or more slide rails 518. The bearing surfaces may be attached to the sliding wall 110-c and/or 110-d and may not be attached to the other fixed components of the hopper. This may ensure that the entire internal surface may move because material may build up on any flat unmoving surface. The specific types and dimension of the components are provided as examples; some embodiments may utilize different components that may include different dimensions.

Figure 5B:
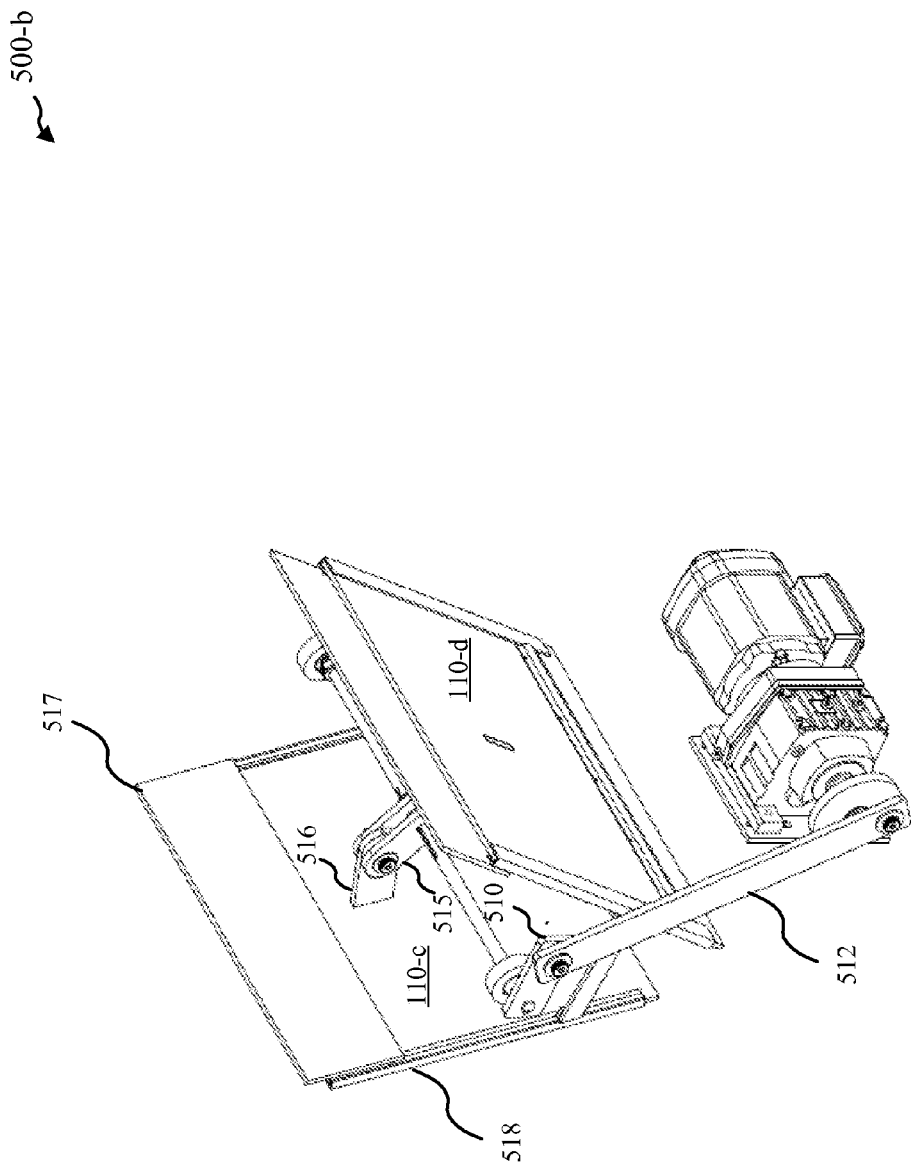
FIG. 5B shows an assembled view of a sliding wall hopper system in accordance with various embodiments.

FIG. 5B shows an assembled view of a sliding wall hopper system 500-b in accordance with various embodiments. System 500-b may be an example of system 500-a of FIG. 5A. System 500-b may provide an example of aspects of system 100 of FIG. 1 or other sliding wall hopper systems described herein. System 500-b may include multiple sliding walls, such as sliding wall 110-c and 110-d. System 500-b may include short linkage arm 510, which may creating the rocking or sliding motion. System 500-b may include a long linkage arm 512, which may create the rocking or sliding motion. System 500-b may include one or more feed hopper moment arms 515. Arm(s) 515 may hold two more fixed pins that may slide and down the slot of feeder hopper agitator tab(s) 516, which may attach to sliding walls 110-c and/or 110-d. System 500-b may include one or more guide plates 517, that may keep falling material, such as biomass, from going behind the sliding walls 110-c and/or 110-d. System 500-b may include one or more slide rails 518. The bearing surfaces may be attached to the sliding wall 110-c and/or 110-d and may not be attached to the other fixed components of the hopper. This may ensure that the entire internal surface may move because material may build up on any flat unmoving surface. The specific types and dimension of the components are provided as examples; some embodiments may utilize different components that may include different dimensions.

Figure 5C:
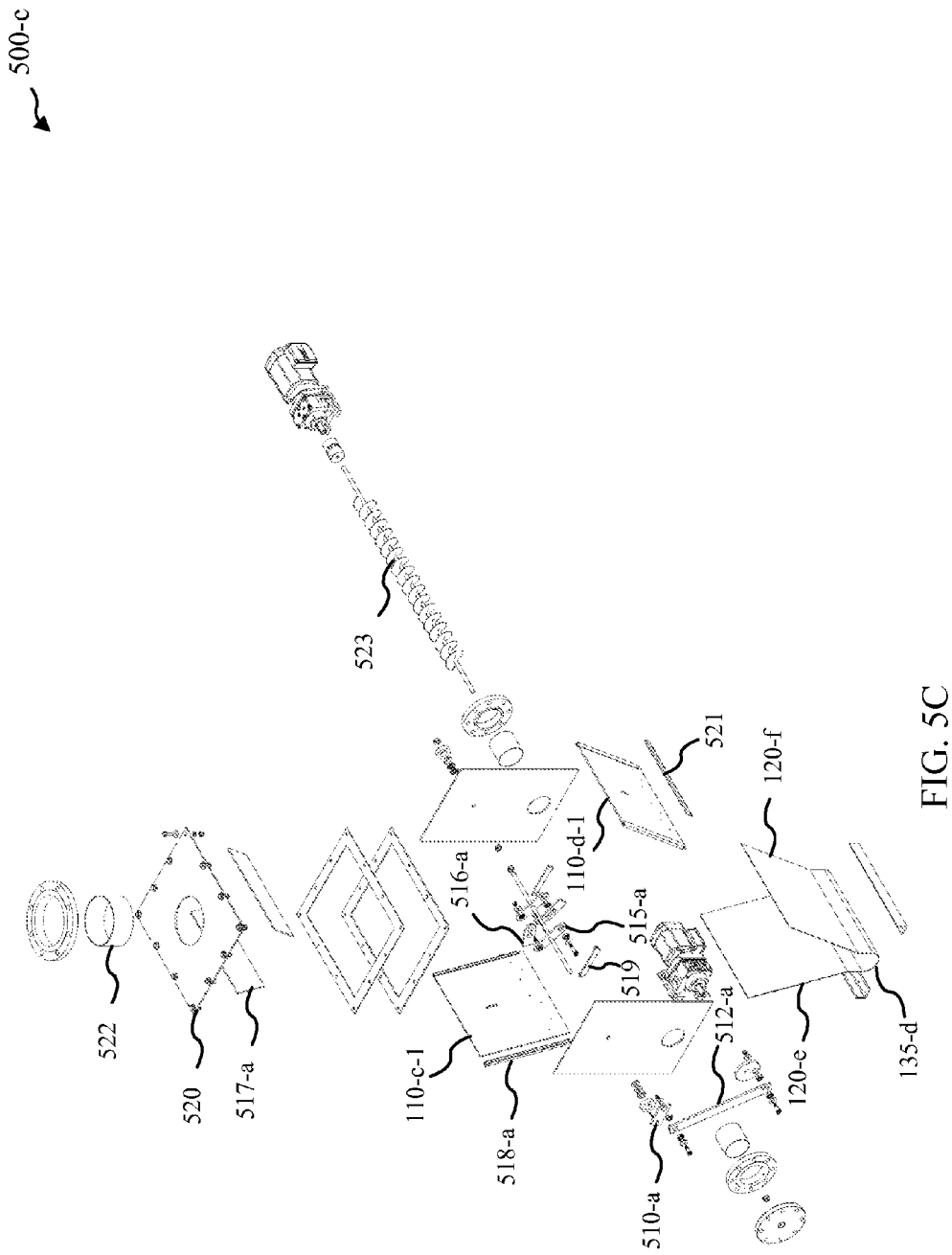
FIG. 5C shows an exploded view of a sliding wall hopper system in accordance with various embodiments.

FIG. 5C shows an explosion view of a sliding wall hopper system 500-c in accordance with various embodiments. System 500-c may provide an example of aspects of system 100 of FIG. 1 or other sliding wall hopper systems described herein. System 500-c may include multiple sliding walls, such as sliding walls or inner walls 110-c-1 and 110-d-1. System 500-c may include an outer hopper supports or outer walls 120-e and 120-f and/or hopper discharge 135-d. System 500-c may include short linkage arm 510-a, which may creating the rocking or sliding motion. System 500-c may include a long linkage arm 512-a, which may create the rocking or sliding motion. System 500-c may include one or more feed hopper moment arms 515-a. Arm(s) 515-a may hold two more fixed pins that may slide and down the slot of feeder hopper agitator tab(s) 516-a, which may attach to sliding walls 110-c-1 and/or 110-d-1. System 500-c may include one or more guide plates 517-a, that may keep falling material, such as biomass, from going behind the sliding walls 110-c-1 and/or 110-d-1. System 500-c may include one or more slide rails 518-a. The bearing surfaces may be attached to the sliding wall 110-c-1 and/or 110-d-1 and may not be attached to the other fixed components of the hopper.

This may ensure that the entire internal surface may move because material may build up on any flat unmoving surface. System 500-*c* may also include one or more augers 523. The specific types and dimension of the components are provided as examples; some embodiments may utilize different components that may include different dimensions.

In some cases, the guide plates or covers 517-*a* may be integrated into a lid 520. FIG. 5C shows one or more rails 519 that may be installed parallel with the lid 520 and may keep the lower portion of the sliding walls 110 from rising away from the outer wall 120. In some cases, the thickness of the sliding wall may be made such that it may not be physically for the sliding walls to lift up and away from the outer walls 120.

Some embodiments may include one or more seals 521. These seal 521 may slide up and down and/or may be compressible so that gas or biomass may be forced through the biomass instead of behind the walls 110. In some embodiments, the seals 521 may include PTFE coated Fiberglass tadpole seal with a stainless hollow core. Rivets, which may include stainless steel rivets, may attach the seal to the wall in a staggered pattern in some embodiments.

In some embodiments, rails 518-*a* may be coupled with the sliding walls 110. In some cases, a silicone adhesive may be utilized to couple the rails 518-*a* with the sliding walls 110. In some cases, the rails 518-*a* may be made of Teflon, which may ease the sliding wall 110 motion. In some embodiments, the rails 518-*a* may be riveted to the sliding walls 110 so that they may not travel up or down on the sliding will.

In some embodiments, one or more bin level indicators may be utilized, such as through the side of pipe 522. The indicator(s) may utilize a tuning fork in some cases. The position of these bin level indicators may facilitate controlling material flow.

Figure 5D:
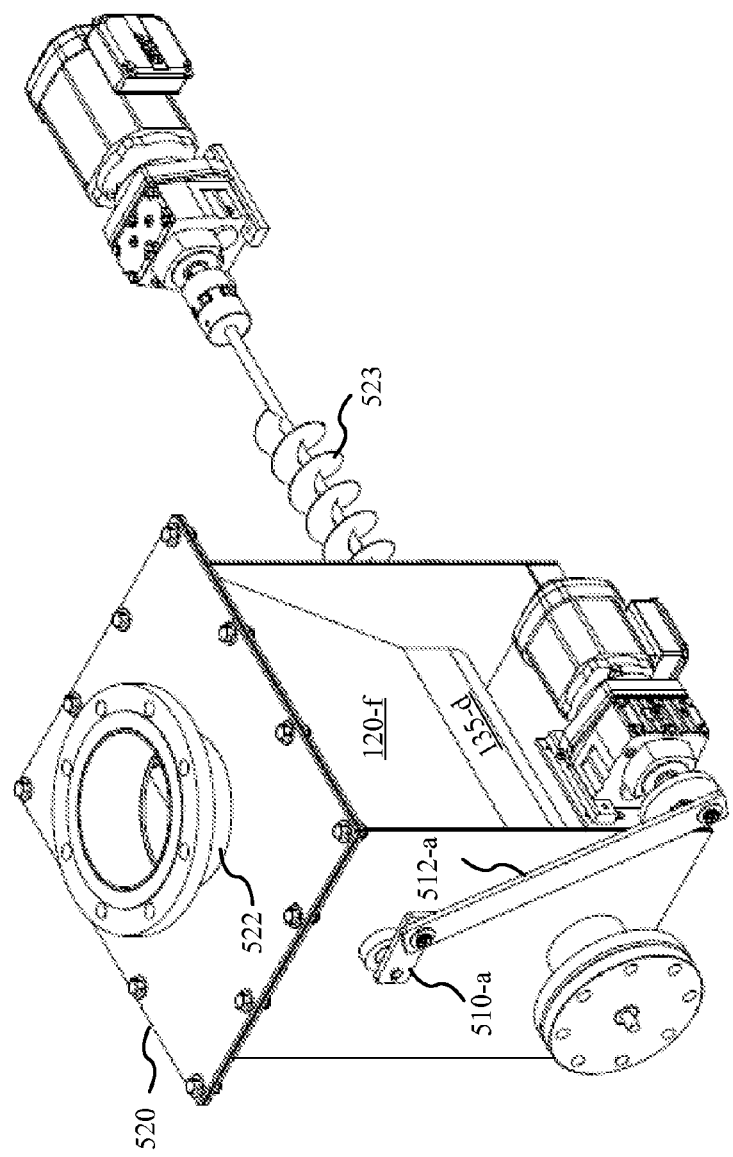
FIG. 5D shows an assembled view of a sliding wall hopper system in accordance with various embodiments.

FIG. 5D shows an assembled view of a sliding wall hopper system 500-*d* in accordance with various embodiments. System 500-*d* may be an example of system 500-*c* of FIG. 5C. System 500-*d* may provide an example of aspects of system 100 of FIG. 1 or other sliding wall hopper systems described herein. System 500-*d* may show a short linkage arm 510-*a*, which may creating the rocking or sliding motion. System 500-*d* may show a long linkage arm 512-*a*, which may create the rocking or sliding motion. System 500-*d* may show an auger 523 along with one or more outer walls or outer hoppers supports 120-*f*, which may be coupled to a hopper discharge 135-*d*. System 500-*d* may also show a pipe 522, lid 520, and/or auger 523. The specific types and dimension of the components are provided as examples; some embodiments may utilize different components that may include different dimensions. System 500-*d* may include other components of system 500-*c*, though not shown due to the assembled view of system 500-*d*

Figure 6A:
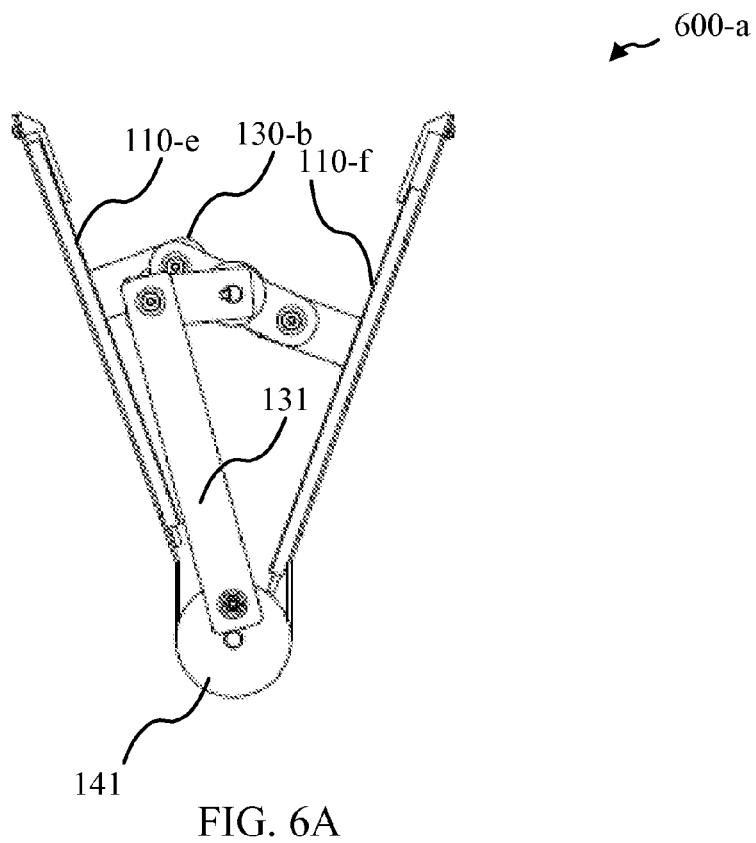
FIGS. 6A and 6B show sliding wall hopper systems in accordance with various embodiments.
Figure 6B:
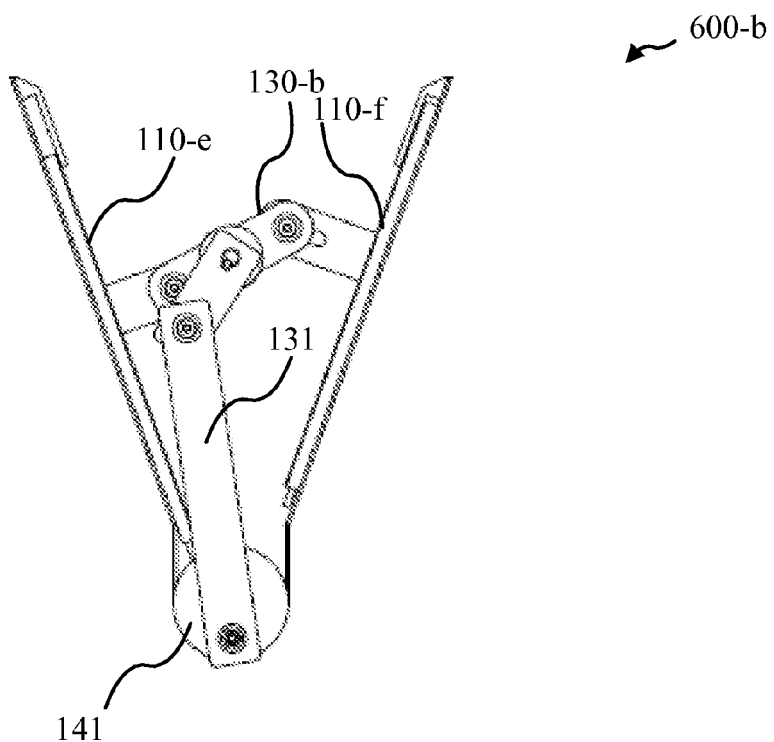

Turning now to FIG. 6A and FIG. 6B, sliding wall hopper systems 600-*a* and 600-*b* in accordance with various embodiments are shown. Systems 600-*a* and/or 600-*b* may provide examples of aspects of system 100 of FIG. 1 or other sliding wall hopper systems described herein. As the flywheel 141 completes one revolution each wall 110-*e* and 110-*f* goes completely up and down. Each wall 110-*e*/110-*f* may be moving in the opposite direction as the other. The wall motion shown creates a tumbling of the internal contents. Flywheel 141 may be part of a conveyor device. Systems 600-*a* and 600-*b* may also include agitation devices 130-*b*, which may be coupled with flywheel 141 or a conveyor device in general utilizing mechanical linkage 131.

Figure 7:
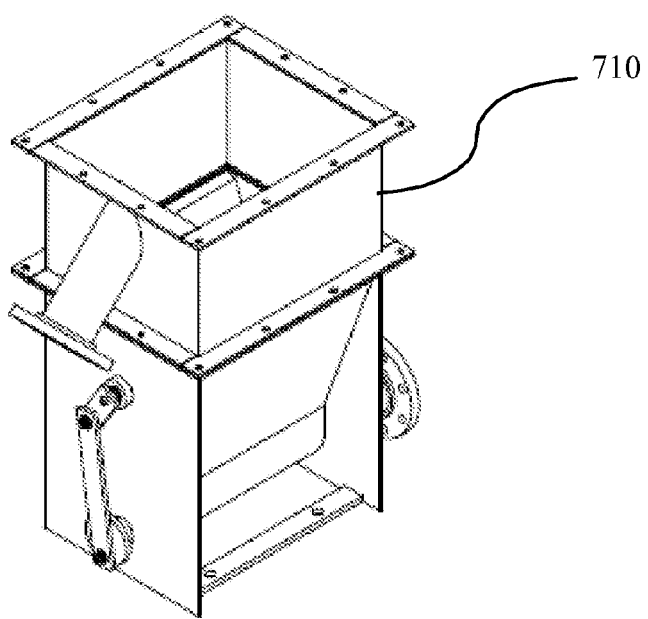
FIG. 7 shows a sliding wall hopper system in accordance with various embodiments.

FIG. 7 shows a sliding wall hopper system 700 in accordance with various embodiments with a volumetric extension 710 above the agitated area. System 700 may provide an example of aspects of system 100 of FIG. 1 or other sliding wall hopper systems described herein. In some cases, the contents of system 700 may be emptied completely when the height of the vertical extension may be equal to the width of the hopper. Some embodiments may include a higher extension 710. In some embodiments, a height of an extension 710 may be greater than a height of the sliding wall hopper below. Some embodiments with a taller extension may be applicable for a silo type application, where the bottom silo reclaim device may be a sliding wall agitator. In some cases, adding an extension 710 may leave room to increase the height of the material, such as biomass, above the sliding walls. Adding an extension 710 may increase surge capacity. The entire hopper scale may be increased to increase capacity.

Figure 8:
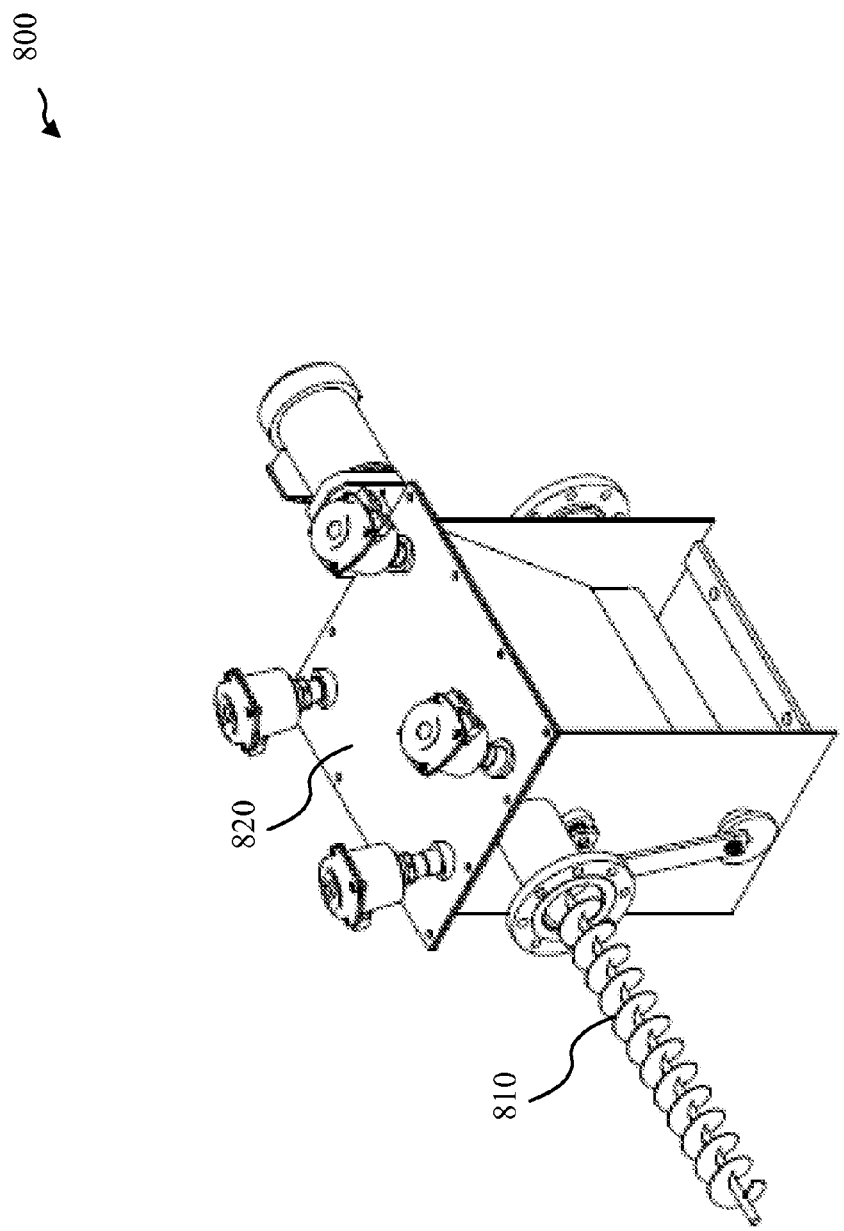
FIG. 8 shows a sliding wall hopper system in accordance with various embodiments.

FIG. 8 shows a sliding wall hopper system 800 in accordance with various embodiments. System 800 may provide an example of aspects of system 100 of FIG. 1 or other sliding wall hopper systems described herein. System 800 may be filled by an auger 810 from the sidewall. Standard bin level indicators may be incorporated because of the internal clearances of the hopper. This may allow for more control of the hopper contents showing high and low levels of the contents. The entire hopper can be sealed with hopper slide 820 for higher-pressure applications since the agitation mechanism may be internal to the hopper system 800. In some embodiments, system 800 may be capable of 75 psi, but higher pressures may be possible depending on the application.

Figure 9:
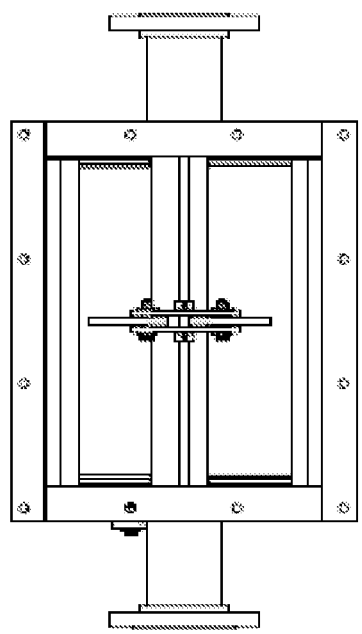
FIG. 9 shows a sliding wall hopper system in accordance with various embodiments.

FIG. 9 shows a top view of the hopper internals of a sliding wall hopper system 900 in accordance with various embodiments. System 900 may provide an example of aspects of system 100 of FIG. 1 or other sliding wall hopper systems described herein. From this view, one may notice the clearance available with the agitation method in accordance with various embodiments.

Figure 10:
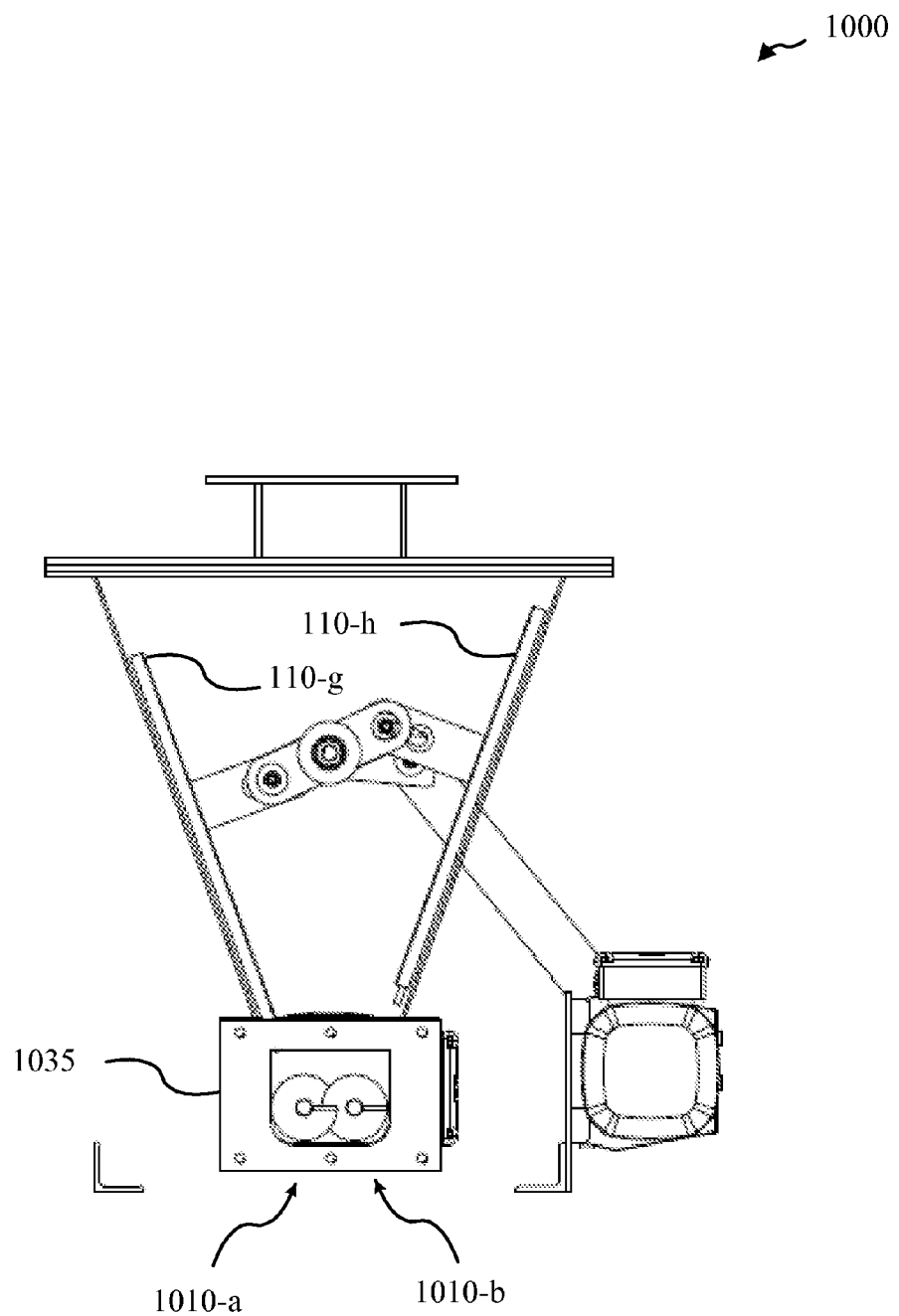
FIG. 10 shows a sliding wall hopper system in accordance with various embodiments.

FIG. 10 shows a sliding wall hopper system 1000 that may utilize multiple augers, such as augers 1010-*a* and/or 1010-*b*. System 1000 may provide an example of aspects of system 100 of FIG. 1 or other sliding wall hopper systems described herein. In particular, system 1000 shows a double auger discharge 1035 that may be integrated into the sliding wall hopper system 1000. The double augers 1010 may have synchronized rotation so that the augers flight may maintain proper clearance and stay in phase. The slide walls 110-*g* and 110-*h* may be farther apart so that the additional auger 1010 may be accommodated. FIG. 10 provides an example showing the variety of discharge types 1035 at the bottom of the agitating slide walls 110 that may be utilized in accordance with various embodiments.

Figure 11:
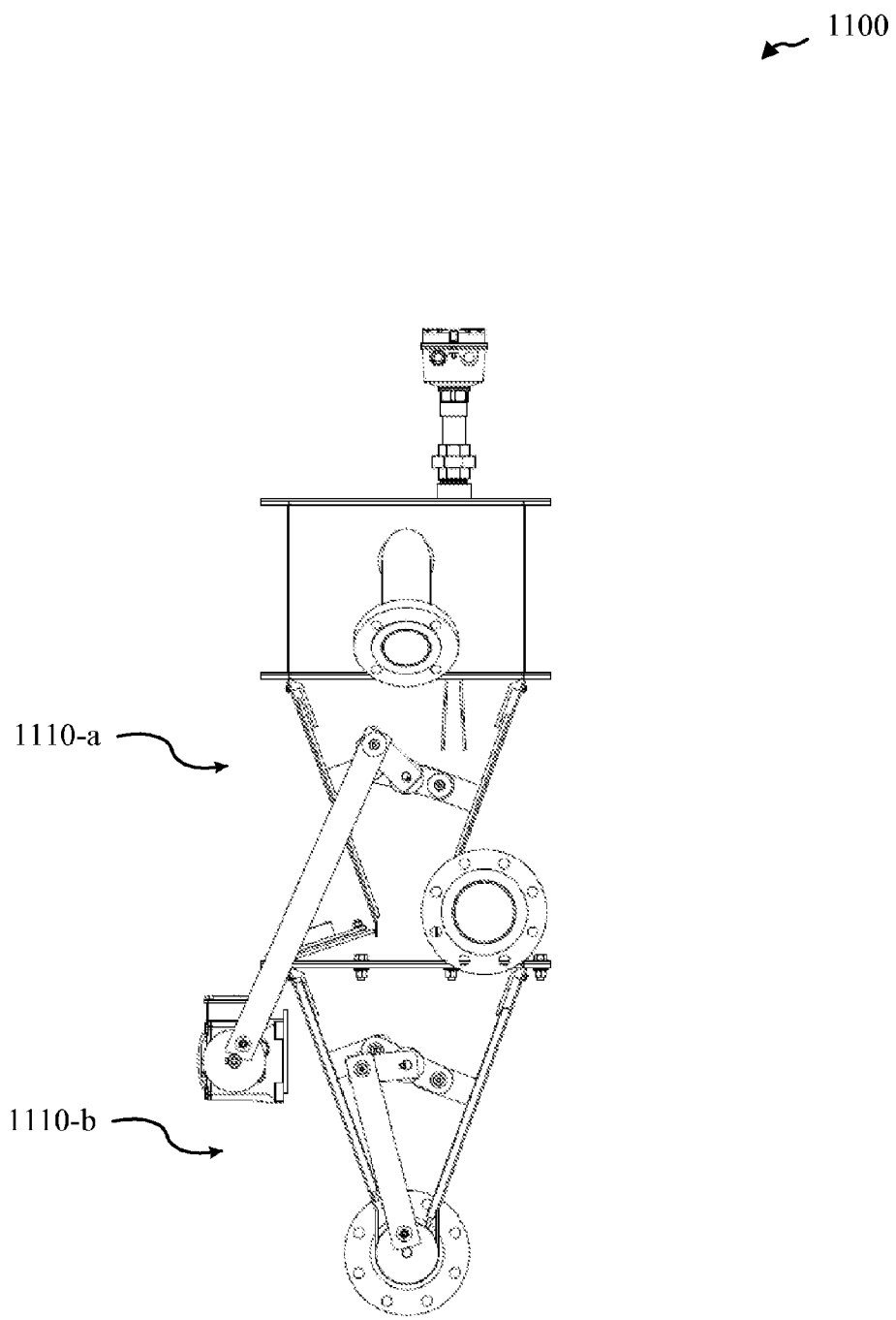
FIG. 11 shows a sliding wall hopper system in accordance with various embodiments.

FIG. 11 shows a sliding wall hopper system 1100 that may include multiple sliding wall configurations 1110. System 1100 may provide an example of aspects of system 100 of FIG. 1 or other sliding wall hopper systems described herein. For example, system 1100 may include stacking hoppers 1110-*a* and 1110-*b* on top of each other, and may be covered or next to each other may be covered. In some embodiments, two sliding wall hoppers 1110 vertically stacked may be integrated into recapture methods, systems, and devices as described in U.S. application Ser. No. 13/800,252, titled "METHODS, SYSTEMS, AND DEVICES FOR SYNTHESIS GAS RECAPTURE" and filed Mar. 13, 2013, incorporated by reference for all purposes.

In some embodiments, sliding wall hopper system 1100 may be utilized as a sliding wall particle size classifier. For example, system 1100 may combine the two sliding walls into one piece of sliding mesh that may go from one side down the chute underneath the auger/conveyor and back up the other chute and up the opposite wall. The smaller particles may then drop out the bottom of the hopper and the larger particles would be conveyed with the conveying device. The mesh may have varying opening sizes depending on the desired particle size separation. The particle size distribution may be broken down into sections by having multiple hoppers in series. For example, the first hopper may remove particles below 10 mesh and the next would remove particles below 50 mesh and so on.

Figure 12A:
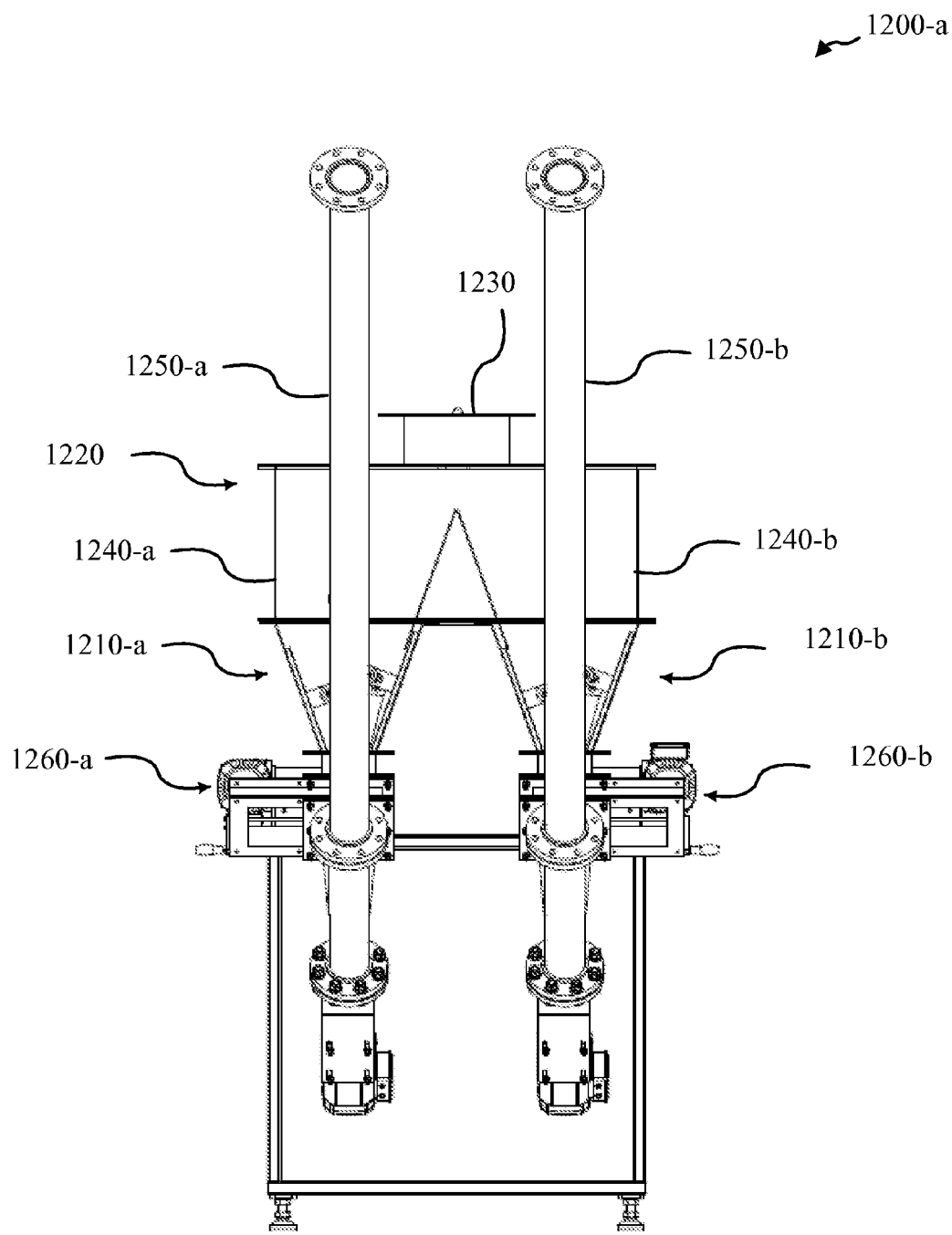
FIG. 12A shows a sliding wall hopper system in accordance with various embodiments.

FIG. 12A shows sliding wall hopper system 1200-a that may include multiple sliding wall configurations. System 1200-a may provide an example of aspects of system 100 of FIG. 1 or other sliding wall hopper systems described herein. System 1200-a shows an example of setting two of these sliding wall hoppers 1210-a and 1210-b next to each other. The multiple sliding wall hoppers 1210 may be used as an expansion joint. This may allow for conveying material to one drop point but to have two independent discharge paths. For example, in this configuration, a flow splitting container 1220 may be shown that may have one inlet 1230 and two outlets 1240-a and/or 1240-b. Two slide wall hoppers 1210 may be utilized together that may split an incoming pile towards both discharges. One or more gear boxes and motors 1260-a may be utilized to drive each set of slide walls and discharge auger (obstructed from view; see, e.g., FIG. 12B). In some embodiments, one or more angled augers 1250-a and/or 1250-b may be integrated into system 1200-b, which may take material up from the floor into another bin. The transition between the two augers may be angled to minimize compaction in this area. Some embodiments may utilize one or more maintenance gates between both horizontal & angled augers so that discharge streams may be isolated. Bin level indicators may also be utilized.

Figure 12B:
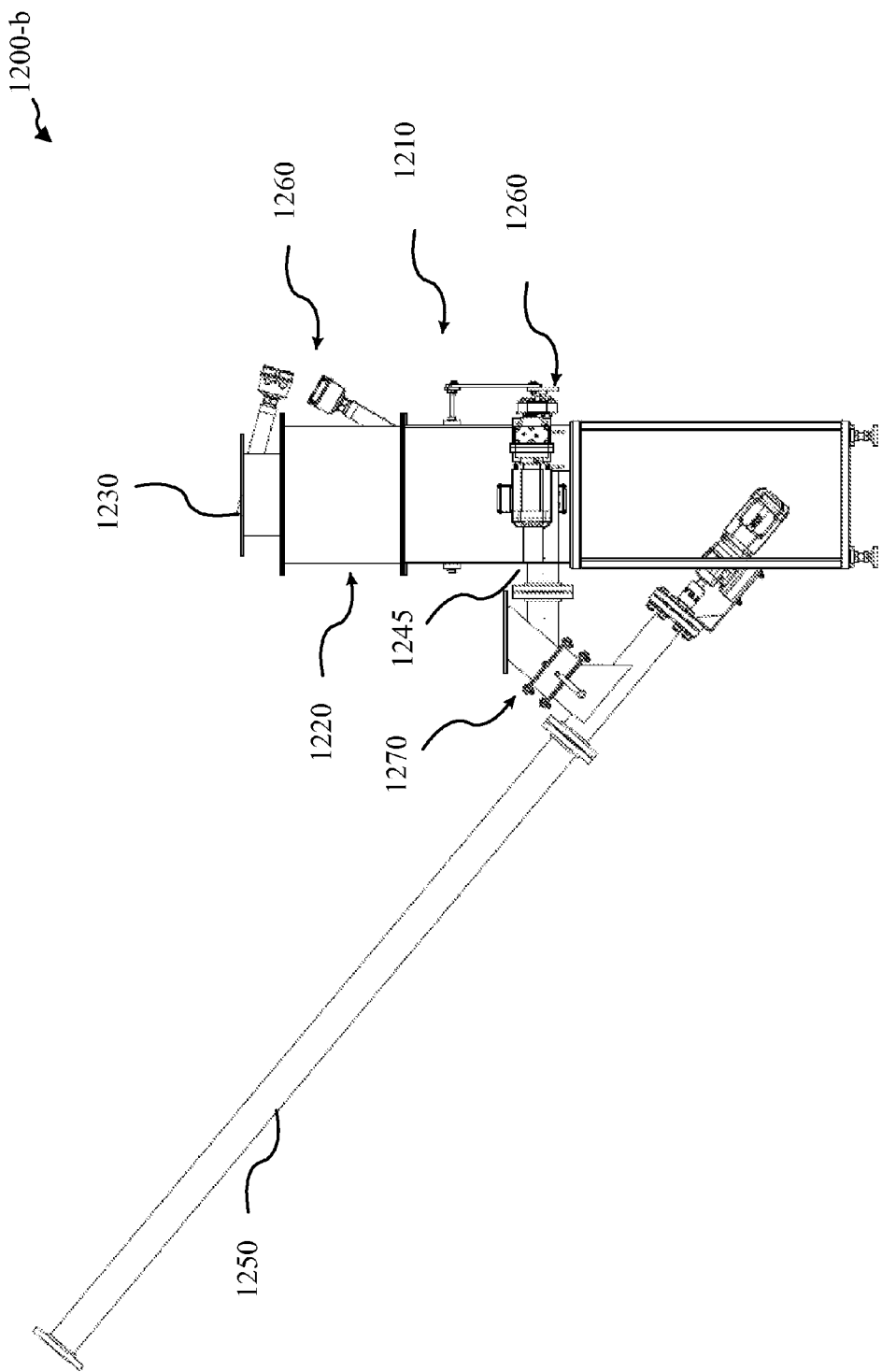
FIG. 12B shows a sliding wall hopper system in accordance with various embodiments.

FIG. 12B shows a side view of a sliding wall hopper system 1200-b that may include multiple sliding wall configurations, though a similar configuration may be utilized with a single sliding wall configuration. System 1200-b may reflect a side view of system 1200-a of FIG. 12A. System 1200-b may provide an example of aspects of system 100 of FIG. 1 or other sliding wall hopper systems described herein. One or more slide wall hoppers or mechanisms 1210 may be utilized together that may split an incoming pile towards both discharges. A flow splitting container 1220 may be shown that may have one inlet 1230 and two outlets (not visible in side view; see, e.g., FIG. 12A). A gear box and one motor 1260 may be utilized to drive each set of slide walls and discharge auger 1245. In some embodiments, one or more angled augers 1250 may be integrated into system 1200-b, which may take material up from the floor into another bin. The transition between the two augers 1245 and 1250 may be angled to minimize compaction in this area. Some embodiments may utilize one or more maintenance gates 1270 between both horizontal 1245 & angled augers 1250 so that discharge streams may be isolated. One or more bin level indicators 1260 may also be utilized.

Figure 13A:
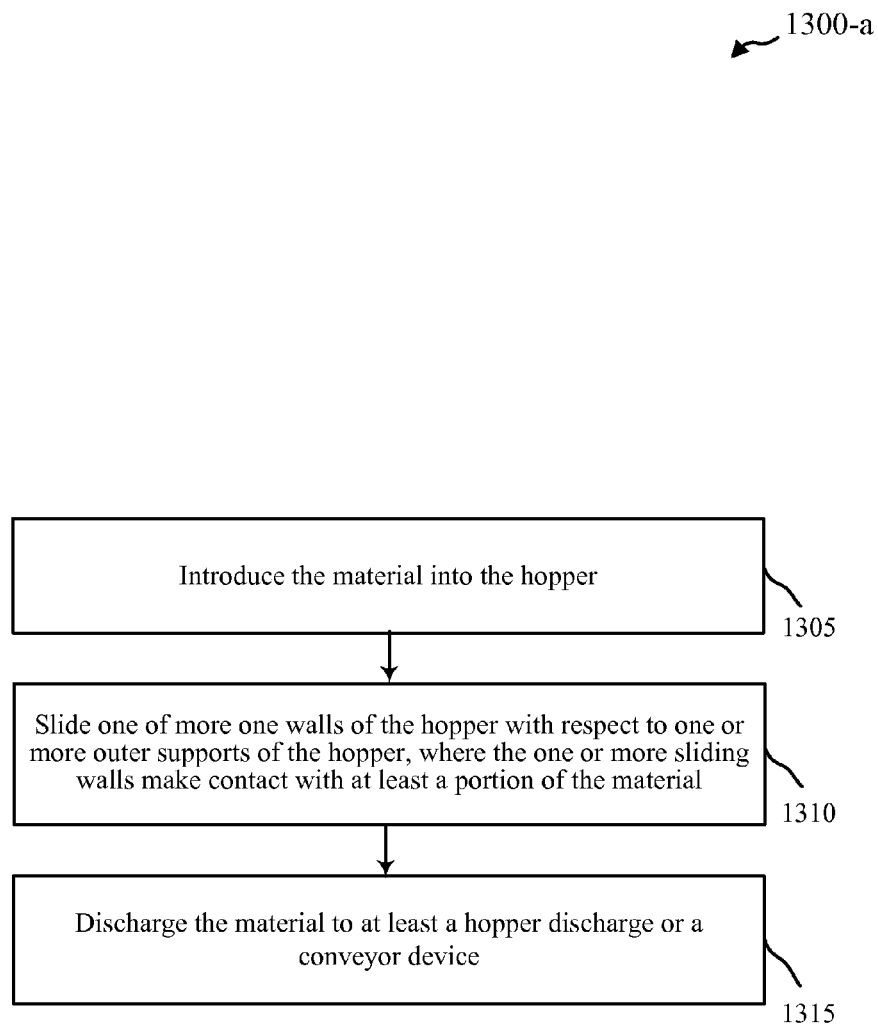
FIG. 13A shows a flow diagram of a method of moving material through a hopper in accordance with various embodiments.

Turning now to FIG. 13A, a flow diagram of a method 1300-a of moving material through a hopper in accordance with various embodiments is provided. Method 1300-a may be implemented by different systems and/or devices including, but not limited to, those shown and/or described with respect to FIGS. 1-12.

At block 1305, material may be introduced into the hopper. In some cases, the material may include biomass. In some cases, other materials may be utilized including, but not limited to, compost, powders, salts, granular solids, plastics, medical waste, and/or cotton waste. Some embodiments may utilize light fibrous material, which may include biomass.

At block 1310, one of more one walls of the hopper may slide with respect to one or more outer supports of the hopper. The one or more sliding walls may make contact with at least a portion of the material. In some embodiments, the one or more walls may be false walls.

In some embodiments, sliding the one or more walls includes sliding at least a first wall and a second wall. Sliding the first wall may be out of phase from sliding the second wall. For example, the first wall may be 180 degrees out of phase from sliding the second wall. In some embodiments, the first wall may be slid in phase with respect to the second wall, though other phases may also be utilized. The first wall, for example, may be upward while the second wall moves downward. Similarly the first wall may move downward while the second wall moves upward. In some cases, sliding the one or more walls occurs in at least a vertical direction with respect to the hopper discharge. In some cases, sliding the one or more walls includes sliding the one or more walls at least towards or away from a hopper discharge. In some cases, each of the one or more sliding walls each slide in at least a respective plane.

The one or more outer supports may include one or more outer walls. In some cases, the outer walls may be solid. In some cases, a mesh wall or other wall that is not solid may be utilized. The one or more outer supports may include one or more roller supports. The roller supports may be configured such that the inner walls may be rolled along the roller supports. Other supports may be utilized where the inner walls may slide along the supports.

In some cases, at least one of the one or more outer supports of the hopper may be moved. For example, at least one of the one or more outer supports of the hopper may be moved towards the material in the hopper.

In general, the one or more walls may be moved mechanically either from components positioned within the hopper and/or components positioned outside the hopper. In some cases, at least one of the one or more walls may be mechanically or electronically coupled with a conveyor device.

At block 1315, the material may be discharged to at least a hopper discharge or a conveyor device. In some cases, the conveyor device may include an auger device. Some embodiments may utilize other conveyor devices including, but not limited to, a chain drag conveyor, a belt conveyor, a vibratory conveyor, and/or a pneumatic conveyor. Other conveyor devices may be utilized in some embodiments.

In some embodiments, additional material may be introduced into the hopper after the one or more walls of the hopper may be slid with respect to the one or more outer supports. The one or more walls of the hopper may then be slid again with respect to the one or more outer supports. The material may then be discharged.

In some embodiments, the hopper may be sealed. For example, a lid may be attached to a hopper to seal the hopper. The hopper may be pressurized in some cases.

In some embodiments, the one or more walls are positioned at an angle between 30 degrees and 80 degree with respect to a horizontal plane that is perpendicular to a gravitational force or the hopper discharge. The one or more walls may be positioned at an angle between 45 degrees and 75 degrees with respect to a horizontal plane that is perpendicular to a gravitational force or the hopper discharge. The one or more walls may be positioned at an angle between 55 degrees and 65 degrees with respect to a horizontal plane that is perpendicular to a gravitational force or the hopper discharge. Other angles may be utilized in some embodiments.

In some embodiments, the hopper discharge includes another hopper. Some embodiments then include: introducing at least a portion of the material into the other hopper; sliding one of more one walls of the other hopper with respect to one or more outer supports of the other hopper, wherein the one or more sliding walls make contact with at least a portion of the material; and/or discharging the material to at least another hopper discharge or another conveyor device. Thus, some embodiments include another hopper vertically integrated with the hopper. Some embodiments may include another hopper horizontally integrated with the hopper.

In some embodiments, the one or more walls include a mesh wall. The mesh wall may be configured to go from one side of the hopper to another side of the hopper. The mesh wall may be configured to slide underneath the conveyor device. In some case, the hopper may be utilized as a particle size classifier. The hopper may be utilized as a particle size classifier with respect to two or more particle sizes. The mesh wall may include varying opening sizes.

In some embodiments, one or more walls include different coatings, textures, spikes, indentions, convex, concave, heating coils, cooling coils, expandable bladder material and/or or something other than flat metal walls.

Some embodiments include sliding one or more additional walls positioned with respect to a chute coupled with one or more outer supports, the hopper discharge, or the conveyor device. Some embodiments include sliding one or more additional walls positioned with respect to the conveyor device.

Figure 13B:
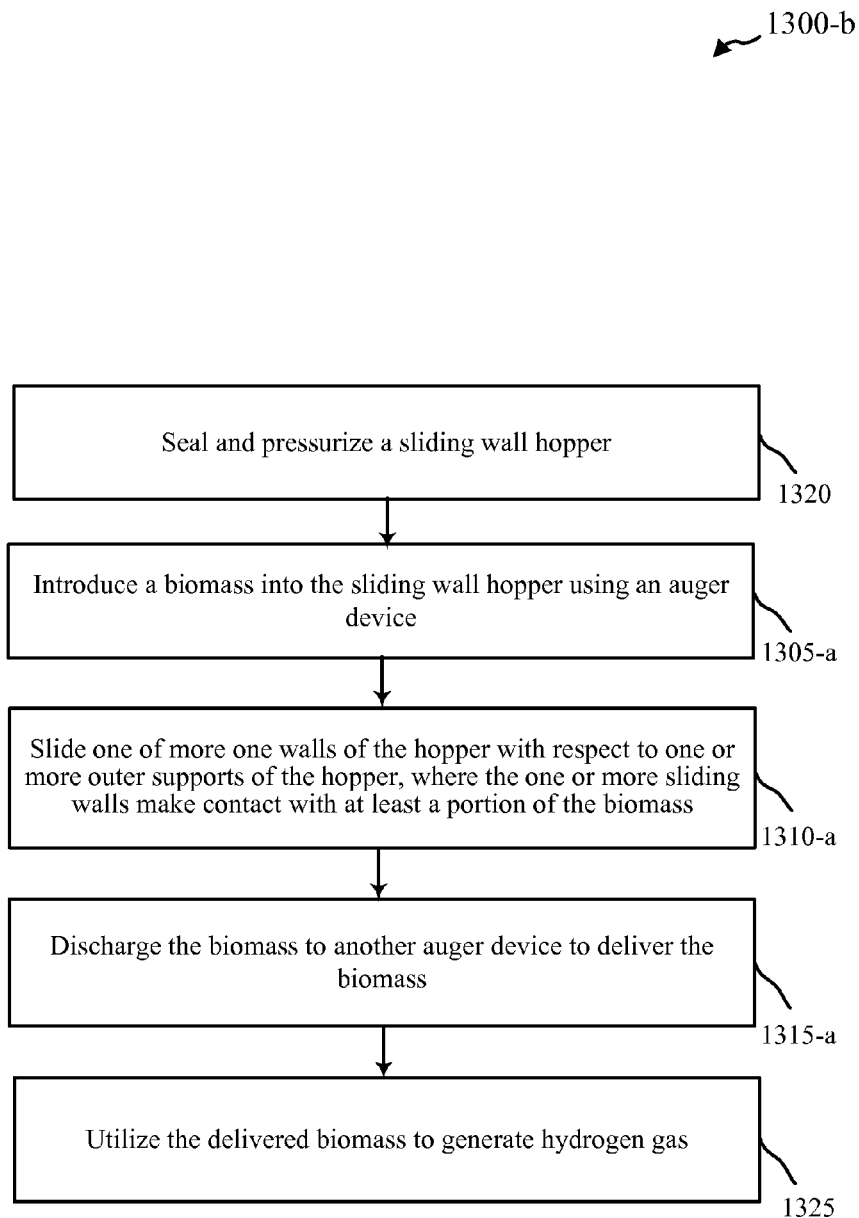
FIG. 13B shows a flow diagram of a method of moving material through a hopper in accordance with various embodiments.

Turning now to FIG. 13B, a flow diagram of a method 1300-b of moving biomass through a hopper in accordance with various embodiments is provided. Method 1300-b may be implemented by different systems and/or devices including, but not limited to, those shown and/or described with respect to FIGS. 1-12. Method 1300-b may be an example of method 1300-a of FIG. 13A.

At block 1320, a sliding wall hopper may be sealed and pressurized. At block 1305-a, biomass may be introduced into the hopper using an auger device. At block 1310-a, one of more one walls of the hopper may be slide with respect to one or more outer supports of the hopper. The one or more sliding walls may make contact with at least a portion of the biomass. At block 1315-a, the biomass may be discharged to another auger device to deliver the biomass. At block 1325, the delivered biomass may be utilized to generate hydrogen gas.

These embodiments may not capture the full extent of combination and permutations of materials and process equipment. However, they may demonstrate the range of applicability of the method, devices, and/or systems. The different embodiments may utilize more or less stages and/or components than those described. The different embodiments may also utilize aspects of each other.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the invention. Also, a number of stages may be undertaken before, during, or after the above elements are considered. Accordingly, the above description should not be taken as limiting the scope of the embodiments.

What is claimed is:

1. A sliding wall hopper system comprising:
   one or more outer hopper supports;
   one or more inner hopper walls;
   a hopper lid configured to facilitate pressurizing the hopper system;
   one or more agitation devices coupled with the one or more inner hopper walls, wherein the one or more agitation devices slide the one or more inner hopper walls with respect to the one or more outer hopper supports and are configured to facilitate pressurizing the hopper system through coupling one or more components of the one or more agitation devices with an inner surface of each respective one or more inner hopper walls; and
   one or more seals positioned with respect to the hopper lid to facilitate pressurizing and sealing the hopper system.

2. The system of claim 1, wherein the one or more agitation devices slide the one or more inner hopper walls with respect to the outer hopper supports such that a first inner wall slides out of phase with a second inner wall.

3. The system of claim 1, wherein the one or more agitation devices slide the one or more inner hopper walls with respect to the outer hopper supports such that the one or more inner walls moves in at least a vertical direction with respect to a hopper discharge.

4. The system of claim 1, further comprising:
   a conveyor device at least mechanically or electronically coupled with the one or more agitation devices.

5. The system of claim 4, wherein the conveyor device comprises at least one auger device.

6. The system of claim 4, wherein the conveyor device comprises at least two auger devices coupled with each other.

7. The system of claim 4, further comprising:
   one or more sliding walls positioned with respect to the conveyor device.

8. The system of claim 1, further comprising:
   one or more agitation devices coupled with the one or more outer hopper supports of the hopper system.

9. The system of claim 1, wherein the one or more agitation devices slide the one or more inner hopper walls with respect to the outer hopper supports such that each of the one or more sliding inner walls each slides in at least a respective plane.

10. The system of claim 1, wherein the one or more agitation devices slide the one or more inner hopper walls towards a hopper discharge.

11. The system of claim 1, wherein the one or more outer hopper supports comprise one or more outer walls.

12. The system of claim 1, wherein
a first hopper device comprises:
the one or more outer hopper supports;
the one or more inner hopper walls; and
the one or more agitation devices coupled with the one or more inner hopper walls, wherein the one or more agitation devices slide the one or more inner hopper walls with respect to the one or more outer hopper supports; and
a second hopper device comprising:
one or more outer hopper supports;
one or more inner hopper walls; and
one or more agitation devices coupled with the one or more inner hopper walls, wherein the one or more agitation devices slide the one or more inner hopper walls with respect to the one or more outer hopper supports.

13. The system of claim 12, wherein the first hopper device is vertically coupled with the second hopper device.

14. The system of claim 12, wherein the first hopper device is horizontally coupled with the second hopper device.

15. The system of claim 13, wherein the system is configured as a particle size classifier with respect to two or more particle sizes.

16. The system of claim 1, wherein the one or more walls comprises a mesh wall.

17. The system of claim 16, wherein the mesh wall is configured to go from one side of the hopper system to another side of the hopper system.

18. The system of claim 1, further comprising:
one or more sliding walls positioned with respect to a chute coupled with one or more outer hopper supports.

19. The system of claim 1, further comprising:
one or more sliding walls positioned with respect to a chute coupled a system discharge.

20. The system of claim 1, further comprising:
a first side wall positioned perpendicular the one or more inner hopper walls; and
a second sidewall positioned perpendicular to the one or more inner hopper walls; and wherein the one or more agitation devices configured to facilitate pressurizing the hopper system comprises:
a first agitator tab coupled with an inner surface of a first inner hopper wall from the one or more inner hopper walls;
a second agitator tab coupled with an inner surface of a second inner hopper wall from the one or more inner hopper walls;
one or more moment arms positioned between inner surface of the first inner hopper wall, the inner surface of the second inner hopper wall, an inner surface the first side wall, and an inner surface of the second side wall, wherein the one or more moment arms couples with the first agitator tab and the second agitator tab with at least a first pin and a second pin, wherein the first pin slides in a slot of the first agitator tab and the second pin slides in a slot of the second agitator tab;
a shaft coupled with the one or more moment arms;
one or more linkages coupled with the shaft with respect to at least the outer surface of the first side wall or the outer surface of the second side wall; and
a motor coupled with the one or more linkages.

21. The system of claim 20, wherein at least the first agitator tab or the second agitator tab comprises a knife cleaning edge configured to help ensure that the slot of the first agitator tab or the slot of the second agitator tab does not get packed with material.

22. The system of claim 1, further comprising one or more seals positioned with respect to the one or more inner hopper walls to prevent at least material or gas from moving between the one or more inner hopper walls and the one or more outer hopper supports.

23. The system of claim 1, wherein the one or more agitation devices includes one or more agitator tabs with one or more knife cleaning edges configured to remove material from one or more slots of the one or more agitator tabs.

24. The system of claim 1, further comprising a pressure source configured to pressurize the hopper system.

25. A sliding wall hopper system comprising:
one or more outer hopper supports;
one or more inner hopper walls, wherein the one or more inner hopper walls comprises a mesh wall, wherein the mesh wall is configured to go from one side of the hopper system to another side of the hopper system and to slide underneath a conveyor device; and
one or more agitation devices coupled with the one or more inner hopper walls, wherein the one or more agitation devices slide the one or more inner hopper walls with respect to the one or more outer hopper supports.

26. A sliding wall hopper system comprising:
one or more outer hopper supports;
one or more inner hopper walls, wherein the one or more inner hopper walls comprises a mesh wall and the mesh wall comprises varying opening sizes; and
one or more agitation devices coupled with the one or more inner hopper walls, wherein the one or more agitation devices slide the one or more inner hopper walls with respect to the one or more outer hopper supports.

* * * * *